United States Patent
Razaghi et al.

(10) Patent No.: US 10,410,021 B1
(45) Date of Patent: Sep. 10, 2019

(54) TRANSACTION OBJECT READER WITH DIGITAL SIGNAL INPUT/OUTPUT AND INTERNAL AUDIO-BASED COMMUNICATION

(71) Applicant: Square, Inc., San Francisco, CA (US)

(72) Inventors: Mani Razaghi, San Francisco, CA (US); Joseph Laucks, San Francisco, CA (US); Jeremy Martin, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 0 days.

(21) Appl. No.: 15/836,691

(22) Filed: Dec. 8, 2017

(51) Int. Cl.
| | |
|---|---|
| *G06K 7/08* | (2006.01) |
| *G06Q 20/32* | (2012.01) |
| *G06K 13/067* | (2006.01) |
| *H04W 4/24* | (2018.01) |

(52) U.S. Cl.
CPC ............ *G06K 7/089* (2013.01); *G06K 7/083* (2013.01); *G06K 7/087* (2013.01); *G06K 13/067* (2013.01); *G06Q 20/32* (2013.01); *H04W 4/24* (2013.01)

(58) Field of Classification Search
CPC ...... G06K 7/0004; G06K 7/083; G06K 7/087; G06K 7/089; G06K 7/10336
USPC ................................................ 235/440, 449
See application file for complete search history.

(56) References Cited

U.S. PATENT DOCUMENTS

| | | |
|---|---|---|
| 3,854,036 A | 12/1974 | Gupta et al. |
| 4,035,614 A | 7/1977 | Frattarola et al. |
| 4,254,441 A | 3/1981 | Fisher |
| 4,591,937 A | 5/1986 | Nakarai et al. |
| 4,609,957 A | 9/1986 | Gentet et al. |
| 4,727,544 A | 2/1988 | Brunner et al. |
| 4,788,420 A | 11/1988 | Chang et al. |

(Continued)

FOREIGN PATENT DOCUMENTS

| | | |
|---|---|---|
| CA | 2 811 979 A1 | 4/2012 |
| CA | 2 812 251 A1 | 4/2012 |

(Continued)

OTHER PUBLICATIONS

Notice of Allowance dated Jul. 1, 2014 for U.S. Appl. No. 13/043,258, of McKelvey, J., filed Mar. 8, 2011.

(Continued)

*Primary Examiner* — Toan C Ly
(74) *Attorney, Agent, or Firm* — Polsinelli

(57) ABSTRACT

A card reader includes a digital connector such as a Universal Serial Bus (USB) plug or an Apple® Lightning® plug. The digital connector includes a corresponding connector interface, which provides voltage to at least a card reader interface and an integrated circuit (IC) of the card reader. The card reader interface outputs an analog transaction information signal upon reading the card. The IC generates a digital version of the analog transaction information signal, encrypts the digital version, converts that into an analog audio signal. The audio signal can then be sent to the connector interface, which converts it into a digital signal such as a USB or Apple® Lightning® signal that is sent by the digital connector to a mobile device. Alternately, the audio signal can be sent to a microcontroller that converts the audio signal to a digital format such as USB, and then to the digital connector.

20 Claims, 12 Drawing Sheets

(56) References Cited

U.S. PATENT DOCUMENTS

| | | |
|---|---|---|
| 4,845,740 A | 7/1989 | Tokuyama et al. |
| 5,091,811 A | 2/1992 | Chang |
| 5,173,597 A | 12/1992 | Anglin |
| 5,266,789 A | 11/1993 | Anglin et al. |
| 5,270,523 A | 12/1993 | Chang et al. |
| 5,406,627 A | 4/1995 | Thompson et al. |
| 5,434,400 A | 7/1995 | Scherzer |
| 5,463,678 A | 10/1995 | Kepley, III et al. |
| 5,589,855 A | 12/1996 | Blumstein et al. |
| 5,603,078 A | 2/1997 | Henderson et al. |
| 5,616,904 A | 4/1997 | Fernadez |
| 5,679,943 A | 10/1997 | Schultz et al. |
| 5,729,591 A | 3/1998 | Bailey |
| 5,764,742 A | 6/1998 | Howard et al. |
| 5,850,599 A | 12/1998 | Seiderman |
| 5,878,337 A | 3/1999 | Joao et al. |
| 5,907,801 A | 5/1999 | Albert et al. |
| 5,945,654 A | 8/1999 | Huang |
| 5,991,410 A | 11/1999 | Albert et al. |
| 5,991,749 A | 11/1999 | Morrill, Jr. |
| 6,006,109 A | 12/1999 | Shin |
| 6,010,067 A | 1/2000 | Elbaum |
| 6,021,944 A | 2/2000 | Arakaki |
| 6,032,859 A | 3/2000 | Muehlberger et al. |
| 6,061,666 A | 5/2000 | Do et al. |
| 6,095,410 A | 8/2000 | Andersen et al. |
| 6,129,277 A | 10/2000 | Grant et al. |
| 6,234,389 B1 | 5/2001 | Valliani et al. |
| 6,308,227 B1 | 10/2001 | Kumar et al. |
| 6,341,353 B1 | 1/2002 | Herman et al. |
| 6,363,139 B1 | 3/2002 | Zurek et al. |
| 6,400,517 B1 | 6/2002 | Murao |
| 6,431,445 B1 | 8/2002 | DeLand et al. |
| 6,476,743 B1 | 11/2002 | Brown et al. |
| 6,481,623 B1 | 11/2002 | Grant et al. |
| 6,497,368 B1 | 12/2002 | Friend et al. |
| 6,536,670 B1 | 3/2003 | Postman et al. |
| 6,612,488 B2 | 9/2003 | Suzuki |
| 6,813,608 B1 | 11/2004 | Baranowski |
| 6,832,721 B2 | 12/2004 | Fujii |
| 6,850,147 B1 | 2/2005 | Prokoski et al. |
| 6,868,391 B1 | 3/2005 | Hultgren |
| 6,896,182 B2 | 5/2005 | Sakaguchi |
| 6,898,598 B2 | 5/2005 | Himmel et al. |
| 6,944,782 B2 | 9/2005 | von Mueller et al. |
| 7,003,316 B1 | 2/2006 | Elias et al. |
| 7,013,149 B2 | 3/2006 | Vetro et al. |
| 7,149,296 B2 | 12/2006 | Brown et al. |
| 7,163,148 B2 | 1/2007 | Durbin et al. |
| 7,167,711 B1 | 1/2007 | Dennis |
| 7,252,232 B2 | 8/2007 | Fernandes et al. |
| 7,309,012 B2 | 12/2007 | von Mueller et al. |
| 7,324,836 B2 | 1/2008 | Steenstra et al. |
| 7,409,234 B2 | 8/2008 | Glezerman |
| 7,433,452 B2 | 10/2008 | Taylor et al. |
| 7,505,762 B2 | 3/2009 | Onyon et al. |
| 7,506,812 B2 | 3/2009 | von Mueller et al. |
| 7,520,430 B1 | 4/2009 | Stewart et al. |
| 7,581,678 B2 | 9/2009 | Narendra et al. |
| 7,600,673 B2 | 10/2009 | Stoutenburg et al. |
| 7,668,308 B1 | 2/2010 | Wurtz |
| 7,703,676 B2 | 4/2010 | Hart et al. |
| 7,708,189 B1 | 5/2010 | Cipriano |
| 7,757,953 B2 | 7/2010 | Hart et al. |
| 7,793,834 B2 | 9/2010 | Hachey et al. |
| 7,810,729 B2 | 10/2010 | Morley, Jr. |
| 7,869,591 B1 | 1/2011 | Nagel et al. |
| 7,945,494 B2 | 5/2011 | Williams |
| 8,011,587 B2 | 9/2011 | Johnson et al. |
| 8,015,070 B2 | 9/2011 | Sinha et al. |
| 8,231,055 B2 | 7/2012 | Wen |
| 8,297,507 B2 | 10/2012 | Kayani |
| 8,336,771 B2 | 12/2012 | Tsai et al. |
| 8,367,239 B2 | 2/2013 | Hermann |
| 8,376,239 B1 | 2/2013 | Humphrey |
| 8,413,901 B2 | 4/2013 | Wen |
| 8,500,010 B1 | 8/2013 | Marcus et al. |
| 8,560,823 B1 | 10/2013 | Aytek et al. |
| 8,571,989 B2 | 10/2013 | Dorsey et al. |
| 8,573,486 B2 | 11/2013 | McKelvey et al. |
| 8,573,487 B2 | 11/2013 | McKelvey |
| 8,573,489 B2 | 11/2013 | Dorsey et al. |
| 8,584,946 B2 | 11/2013 | Morley, Jr. |
| 8,584,956 B2 | 11/2013 | Wilson et al. |
| 8,602,305 B2 | 12/2013 | Dorsey et al. |
| 8,612,352 B2 | 12/2013 | Dorsey et al. |
| 8,615,445 B2 | 12/2013 | Dorsey et al. |
| 8,640,953 B2 | 2/2014 | Dorsey et al. |
| 8,662,389 B2 | 3/2014 | Dorsey et al. |
| 8,678,277 B2 | 3/2014 | Dorsey et al. |
| 8,701,996 B2 | 4/2014 | Dorsey et al. |
| 8,701,997 B2 | 4/2014 | Dorsey et al. |
| 8,763,900 B2 | 7/2014 | Marcus et al. |
| 8,794,517 B1 | 8/2014 | Templeton et al. |
| 8,820,650 B2 | 9/2014 | Wilson et al. |
| 8,870,070 B2 | 10/2014 | McKelvey et al. |
| 8,870,071 B2 | 10/2014 | McKelvey |
| 8,876,003 B2 | 11/2014 | McKelvey |
| 8,910,868 B1 | 12/2014 | Wade et al. |
| 8,931,699 B1 | 1/2015 | Wade et al. |
| 8,967,465 B1 | 3/2015 | Wade et al. |
| 9,016,572 B2 | 4/2015 | Babu et al. |
| 9,141,950 B2 | 9/2015 | Wade et al. |
| 9,195,454 B2 | 11/2015 | Wade et al. |
| 9,218,517 B2 | 12/2015 | Morley, Jr. |
| 9,224,142 B2 | 12/2015 | Lamba et al. |
| 9,230,143 B2 | 1/2016 | Wade et al. |
| 9,237,401 B2 | 1/2016 | Modi et al. |
| 9,262,757 B2 | 2/2016 | Lamba et al. |
| 9,262,777 B2 | 2/2016 | Lamba et al. |
| 9,286,635 B2 | 3/2016 | Lamba et al. |
| 9,305,314 B2 | 4/2016 | Babu et al. |
| 9,449,203 B2 | 9/2016 | Lamba et al. |
| 9,495,676 B2 | 11/2016 | Lamba et al. |
| 9,595,033 B2 | 3/2017 | Lamba et al. |
| 9,633,236 B1 | 4/2017 | Wade |
| 9,799,025 B2 | 10/2017 | Skoog |
| 9,858,603 B2 | 1/2018 | Lamba et al. |
| 10,057,395 B1* | 8/2018 | Wagstaff ............ H04M 1/0274 |
| 2001/0001856 A1 | 5/2001 | Gould et al. |
| 2002/0002507 A1 | 1/2002 | Hatakeyama |
| 2002/0017568 A1 | 2/2002 | Grant et al. |
| 2002/0030871 A1 | 3/2002 | Anderson et al. |
| 2002/0077974 A1 | 6/2002 | Ortiz |
| 2002/0099648 A1 | 7/2002 | DeVoe et al. |
| 2002/0108062 A1 | 8/2002 | Nakajima et al. |
| 2002/0165462 A1 | 11/2002 | Westbrook et al. |
| 2002/0169541 A1 | 11/2002 | Bouve et al. |
| 2002/0188535 A1 | 12/2002 | Chao et al. |
| 2003/0089772 A1 | 5/2003 | Chien |
| 2003/0132300 A1 | 7/2003 | Dilday et al. |
| 2003/0135463 A1 | 7/2003 | Brown et al. |
| 2003/0144040 A1 | 7/2003 | Liu et al. |
| 2004/0012875 A1 | 1/2004 | Wood |
| 2004/0033726 A1 | 2/2004 | Kao |
| 2004/0041911 A1 | 3/2004 | Odagiri et al. |
| 2004/0058705 A1 | 3/2004 | Morgan et al. |
| 2004/0087339 A1 | 5/2004 | Goldthwaite et al. |
| 2004/0093496 A1 | 5/2004 | Colnot |
| 2004/0104268 A1 | 6/2004 | Bailey |
| 2004/0127256 A1 | 7/2004 | Goldthwaite et al. |
| 2004/0128256 A1 | 7/2004 | Krouse et al. |
| 2004/0151026 A1 | 8/2004 | Naso et al. |
| 2004/0204074 A1 | 10/2004 | Desai |
| 2004/0204082 A1 | 10/2004 | Abeyta |
| 2004/0230489 A1 | 11/2004 | Goldthwaite et al. |
| 2004/0230526 A1 | 11/2004 | Praisner |
| 2004/0235524 A1 | 11/2004 | Abuhamdeh |
| 2005/0077870 A1 | 4/2005 | Ha et al. |
| 2005/0156037 A1 | 7/2005 | Wurzburg |
| 2005/0156038 A1 | 7/2005 | Wurzburg et al. |
| 2005/0167496 A1 | 8/2005 | Morley, Jr. et al. |
| 2005/0194452 A1 | 9/2005 | Nordentoft et al. |
| 2005/0209719 A1 | 9/2005 | Beckert et al. |

(56) References Cited

U.S. PATENT DOCUMENTS

| | | |
|---|---|---|
| 2005/0236480 A1 | 10/2005 | Vrotsos et al. |
| 2005/0242173 A1 | 11/2005 | Suzuki |
| 2005/0247787 A1 | 11/2005 | Von Mueller et al. |
| 2006/0000917 A1 | 1/2006 | Kim et al. |
| 2006/0094481 A1 | 5/2006 | Gullickson |
| 2006/0122902 A1 | 6/2006 | Petrov et al. |
| 2006/0123138 A1 | 6/2006 | Perdomo et al. |
| 2006/0142058 A1 | 6/2006 | Elias et al. |
| 2006/0152276 A1 | 7/2006 | Barksdale |
| 2006/0208066 A1 | 9/2006 | Finn et al. |
| 2006/0219776 A1 | 10/2006 | Finn |
| 2006/0223580 A1 | 10/2006 | Antonio et al. |
| 2006/0234771 A1 | 10/2006 | Shavrov |
| 2006/0273158 A1 | 12/2006 | Suzuki |
| 2007/0063048 A1 | 3/2007 | Havens et al. |
| 2007/0067833 A1 | 3/2007 | Colnot |
| 2007/0100651 A1 | 5/2007 | Ramer et al. |
| 2007/0124211 A1 | 5/2007 | Smith |
| 2007/0155430 A1 | 7/2007 | Cheon et al. |
| 2007/0174080 A1 | 7/2007 | Outwater |
| 2007/0201492 A1 | 8/2007 | Kobayashi |
| 2007/0203836 A1 | 8/2007 | Dodin |
| 2007/0221728 A1 | 9/2007 | Ferro et al. |
| 2007/0236336 A1 | 10/2007 | Borcherding |
| 2007/0244811 A1 | 10/2007 | Tumminaro |
| 2007/0250623 A1 | 10/2007 | Hickey et al. |
| 2007/0255620 A1 | 11/2007 | Tumminaro et al. |
| 2007/0255643 A1 | 11/2007 | Capuano et al. |
| 2007/0255653 A1 | 11/2007 | Tumminaro et al. |
| 2008/0027815 A1 | 1/2008 | Johnson et al. |
| 2008/0040265 A1 | 2/2008 | Rackley, III et al. |
| 2008/0040274 A1 | 2/2008 | Uzo |
| 2008/0059370 A1 | 3/2008 | Sada et al. |
| 2008/0059375 A1 | 3/2008 | Abifaker |
| 2008/0103972 A1 | 5/2008 | Lanc |
| 2008/0130913 A1 | 6/2008 | Kong et al. |
| 2008/0147564 A1 | 6/2008 | Singhal |
| 2008/0172306 A1 | 7/2008 | Schorr et al. |
| 2008/0177662 A1 | 7/2008 | Smith et al. |
| 2008/0208762 A1 | 8/2008 | Arthur et al. |
| 2008/0238610 A1 | 10/2008 | Rosenberg |
| 2008/0249939 A1 | 10/2008 | Veenstra |
| 2008/0275779 A1 | 11/2008 | Lakshminarayanan |
| 2008/0294766 A1 | 11/2008 | Wang et al. |
| 2009/0048978 A1 | 2/2009 | Ginter et al. |
| 2009/0068982 A1 | 3/2009 | Chen et al. |
| 2009/0098908 A1 | 4/2009 | Silverbrook et al. |
| 2009/0100168 A1 | 4/2009 | Harris |
| 2009/0104920 A1 | 4/2009 | Moon et al. |
| 2009/0117883 A1 | 5/2009 | Coifing et al. |
| 2009/0119190 A1 | 5/2009 | Realini |
| 2009/0125429 A1 | 5/2009 | Takayama |
| 2009/0144161 A1 | 6/2009 | Fisher |
| 2009/0159681 A1 | 6/2009 | Mullen et al. |
| 2009/0166422 A1 | 7/2009 | Biskupski |
| 2009/0180354 A1 | 7/2009 | Sander et al. |
| 2009/0187492 A1 | 7/2009 | Hammad et al. |
| 2010/0063893 A1 | 3/2010 | Townsend |
| 2010/0117806 A1 | 5/2010 | Hong |
| 2010/0127857 A1 | 5/2010 | Kilmurray et al. |
| 2010/0128900 A1 | 5/2010 | Johnson |
| 2010/0184479 A1 | 7/2010 | Griffin, Jr. |
| 2010/0222000 A1 | 9/2010 | Sauer et al. |
| 2010/0243732 A1 | 9/2010 | Wallner |
| 2010/0260341 A1 | 10/2010 | Sander et al. |
| 2010/0314446 A1 | 12/2010 | Morley, Jr. |
| 2010/0332339 A1 | 12/2010 | Patel et al. |
| 2011/0053560 A1 | 3/2011 | Jain et al. |
| 2011/0062235 A1 | 3/2011 | Morley, Jr. |
| 2011/0084131 A1 | 4/2011 | McKelvey |
| 2011/0084139 A1 | 4/2011 | McKelvey et al. |
| 2011/0137803 A1 | 6/2011 | Willins |
| 2011/0161235 A1 | 6/2011 | Beenau et al. |
| 2011/0191196 A1 | 8/2011 | Orr et al. |
| 2011/0198395 A1 | 8/2011 | Chen |
| 2011/0202463 A1 | 8/2011 | Powell |
| 2011/0231272 A1 | 9/2011 | Englund et al. |
| 2011/0258120 A1 | 10/2011 | Weiss |
| 2011/0295721 A1 | 12/2011 | MacDonald |
| 2011/0313880 A1 | 12/2011 | Paul et al. |
| 2012/0005039 A1 | 1/2012 | Dorsey et al. |
| 2012/0008851 A1 | 1/2012 | Pennock et al. |
| 2012/0011071 A1 | 1/2012 | Pennock et al. |
| 2012/0012653 A1 | 1/2012 | Johnson et al. |
| 2012/0016794 A1 | 1/2012 | Orr et al. |
| 2012/0052910 A1 | 3/2012 | Mu et al. |
| 2012/0061467 A1 | 3/2012 | Tang et al. |
| 2012/0095869 A1 | 4/2012 | McKelvey |
| 2012/0095870 A1 | 4/2012 | McKelvey |
| 2012/0095871 A1 | 4/2012 | Dorsey et al. |
| 2012/0095906 A1 | 4/2012 | Dorsey et al. |
| 2012/0095907 A1 | 4/2012 | Dorsey et al. |
| 2012/0095916 A1 | 4/2012 | Dorsey et al. |
| 2012/0118959 A1 | 5/2012 | Sather et al. |
| 2012/0118960 A1 | 5/2012 | Sather et al. |
| 2012/0126005 A1 | 5/2012 | Dorsey et al. |
| 2012/0126006 A1 | 5/2012 | Dorsey et al. |
| 2012/0126007 A1 | 5/2012 | Lamba et al. |
| 2012/0126010 A1 | 5/2012 | Babu et al. |
| 2012/0126013 A1 | 5/2012 | Sather et al. |
| 2012/0126014 A1 | 5/2012 | Sather et al. |
| 2012/0130903 A1 | 5/2012 | Dorsey et al. |
| 2012/0138683 A1 | 6/2012 | Sather et al. |
| 2012/0154561 A1 | 6/2012 | Chari |
| 2012/0168505 A1 | 7/2012 | Sather et al. |
| 2012/0234918 A1 | 9/2012 | Lindsay |
| 2012/0246074 A1 | 9/2012 | Annamalai et al. |
| 2012/0255996 A1 | 10/2012 | Ahmed et al. |
| 2012/0259651 A1 | 10/2012 | Mallon et al. |
| 2012/0270528 A1 | 10/2012 | Goodman |
| 2012/0293001 A1 | 11/2012 | Chan et al. |
| 2013/0031004 A1 | 1/2013 | Dorsey et al. |
| 2013/0087614 A1 | 4/2013 | Limtao et al. |
| 2013/0130743 A1 | 5/2013 | Lin |
| 2013/0137367 A1 | 5/2013 | Fisher |
| 2013/0200153 A1 | 8/2013 | Dorsey et al. |
| 2013/0207481 A1 | 8/2013 | Gobburu et al. |
| 2013/0254117 A1 | 9/2013 | von Mueller et al. |
| 2013/0254574 A1 | 9/2013 | Zacchio et al. |
| 2013/0299575 A1 | 11/2013 | McKelvey et al. |
| 2013/0304244 A1 | 11/2013 | Ojanpera |
| 2014/0001257 A1 | 1/2014 | Dorsey et al. |
| 2014/0001263 A1 | 1/2014 | Babu et al. |
| 2014/0017955 A1 | 1/2014 | Lo et al. |
| 2014/0018016 A1 | 1/2014 | Chang et al. |
| 2014/0061301 A1 | 3/2014 | Cho et al. |
| 2014/0076964 A1 | 3/2014 | Morley, Jr. |
| 2014/0097242 A1 | 4/2014 | McKelvey |
| 2014/0124576 A1 | 5/2014 | Zhou et al. |
| 2014/0131442 A1 | 5/2014 | Morrow et al. |
| 2014/0144983 A1 | 5/2014 | Dorsey et al. |
| 2014/0203082 A1 | 7/2014 | Huh |
| 2014/0265642 A1 | 9/2014 | Utley et al. |
| 2014/0297539 A1 | 10/2014 | Swamy et al. |
| 2015/0100495 A1 | 4/2015 | Salama et al. |
| 2015/0200590 A1 | 7/2015 | Tanzawa |
| 2016/0188915 A1 | 6/2016 | Babu et al. |
| 2016/0371513 A1 | 12/2016 | Lamba et al. |

FOREIGN PATENT DOCUMENTS

| | | |
|---|---|---|
| CA | 2 812 594 A1 | 4/2012 |
| CA | 2 812 611 A1 | 4/2012 |
| CA | 2 813 236 A1 | 4/2012 |
| CA | 2 813 237 A1 | 4/2012 |
| CA | 2 932 849 A1 | 6/2015 |
| CN | 2459833 Y | 11/2001 |
| CN | 2543289 Y | 4/2003 |
| CN | 1682240 A | 10/2005 |
| CN | 1860730 A | 11/2006 |
| CN | 101520928 A | 9/2009 |
| CN | 102598046 A | 7/2012 |
| CN | 104680369 A | 6/2015 |
| JP | H02-188884 A | 7/1990 |

(56) References Cited

FOREIGN PATENT DOCUMENTS

| | | |
|---|---|---|
| JP | H04-79430 A | 3/1992 |
| JP | H08-147420 A | 6/1996 |
| JP | 2000-184087 A | 6/2000 |
| JP | 2001-175723 A | 6/2001 |
| JP | 2001-313714 A | 11/2001 |
| JP | 2001-37337 A | 12/2001 |
| JP | 2001-527672 A | 12/2001 |
| JP | 2003-016359 A | 1/2003 |
| JP | 2003-108777 A | 4/2003 |
| JP | 2003-242428 A | 8/2003 |
| JP | 2004-078662 A | 3/2004 |
| JP | 2004-326727 A | 11/2004 |
| JP | 2005-063869 A | 3/2005 |
| JP | 200-267031 A | 9/2005 |
| JP | 2005-242550 A | 9/2005 |
| JP | 2005-269172 A | 9/2005 |
| JP | 2006-004264 A | 1/2006 |
| JP | 2006-127390 A | 5/2006 |
| JP | 2006-139641 A | 6/2006 |
| JP | 2006-179060 A | 7/2006 |
| JP | 2006-308438 A | 11/2006 |
| JP | 2006-350450 A | 12/2006 |
| JP | 2008-187375 A | 8/2008 |
| JP | 2009-048567 A | 3/2009 |
| JP | 2009-199649 A | 9/2009 |
| JP | 2009-205196 A | 9/2009 |
| JP | 2010-516002 A | 5/2010 |
| JP | 2010-527063 A | 8/2010 |
| JP | 2013-518344 A | 5/2013 |
| JP | 2013-539889 A | 10/2013 |
| JP | 2013-539890 A | 10/2013 |
| JP | 2013-541105 A | 11/2013 |
| JP | 2013-541106 A | 11/2013 |
| JP | 2013-543180 A | 11/2013 |
| JP | 2014-500537 A | 1/2014 |
| JP | 2017-033603 A | 2/2017 |
| JP | 2017-062844 A | 3/2017 |
| KR | 10-0452161 B1 | 10/2004 |
| KR | 10-2005-0077659 A | 8/2005 |
| KR | 10-2008-0039330 A | 5/2008 |
| MX | 2012004397 A | 8/2012 |
| WO | 01/37199 A1 | 5/2001 |
| WO | 01/65827 A2 | 9/2001 |
| WO | 02/084548 A1 | 10/2002 |
| WO | 2007/084896 A2 | 7/2007 |
| WO | 2010/097711 A2 | 9/2010 |
| WO | 2010/111130 A2 | 9/2010 |
| WO | 2010/135174 A1 | 11/2010 |
| WO | 2011/047028 A2 | 4/2011 |
| WO | 2011/047030 A2 | 4/2011 |
| WO | 2011/093998 A | 8/2011 |
| WO | 2012/051067 A1 | 4/2012 |
| WO | 2012/051069 A1 | 4/2012 |
| WO | 2012/051070 A2 | 4/2012 |
| WO | 2012/051071 A1 | 4/2012 |
| WO | 2012/051072 A1 | 4/2012 |
| WO | 2012/051073 A2 | 4/2012 |
| WO | 2013/009891 A1 | 1/2013 |
| WO | 2013/074499 A1 | 5/2013 |
| WO | 2015/089301 A1 | 6/2015 |
| WO | 2016/028823 A1 | 2/2016 |

OTHER PUBLICATIONS

Notice of Allowance dated Jul. 15, 2014 for U.S. Appl. No. 13/043,263, of McKelvey, J., filed Mar. 8, 2011.
Non-Final Office Action dated Jul. 17, 2014 for U.S. Appl. No. 13/298,491, of Lamba, K., et al., filed Nov. 17, 2011.
Non-Final Office Action dated Jul. 22, 2014 for U.S. Appl. No. 13/298,560, of Lamba, K., et al., filed Nov. 17, 2011.
Corrected Notice of Allowance dated Jul. 30, 2014 for U.S. Appl. No. 14/052,009, of Wilson, M., et al., filed Oct. 11, 2013.
Notice of Allowance dated Aug. 1, 2014 for U.S. Appl. No. 14/203,463, of Wade, J., et al., filed Mar. 10, 2014.
Non-Final Office Action dated Aug. 15, 2014 for U.S. Appl. No. 13/010,976, of Babu, A. R., et al., filed Jan. 21, 2011.
Final Office Action dated Aug. 15, 2014 for U.S. Appl. No. 14/012,655, of McKelvey, J., filed Aug. 28, 2013.
Non-Final Office Action dated Aug. 21, 2014 for U.S. Appl. No. 13/298,487, of Lamba, K., et al., filed Nov. 17, 2011.
English-language translation of First Office Action and Search for Chinese Patent Application No. 2010800514005, dated Sep. 3, 2014.
Non-Final Office Action dated Sep. 11, 2014 for U.S. Appl. No. 13/298,501, of Babu, A., et al., filed Nov. 17, 2011.
Non-Final Office Action dated Sep. 11, 2014 for U.S. Appl. No. 13/298,506, of Lamba, K, et al., filed Nov. 17, 2011.
Non-Final Office Action dated Sep. 11, 2014 for U.S. Appl. No. 13/298,510, of Lamba, K et al., filed Nov. 17, 2011.
Non-Final Office Action dated Oct. 7, 2014 for U.S. Appl. No. 13/298,534, of Lamba, K, et al., filed Nov. 17, 2011.
Notice of Allowance dated Oct. 17, 2014 for U.S. Appl. No. 14/220,967, of Wade, J., et al., filed Mar. 20, 2014.
Notice of Allowance dated Nov. 25, 2014 for U.S. Appl. No. 14/231,598, of Claude, J.B., et al., filed Mar. 31, 2014.
Corrected Notice of Allowance dated Dec. 18, 2014 for U.S. Appl. No. 14/220,967, of Wade, J., et al., filed Mar. 20, 2014.
Notice of Allowance dated Dec. 24, 2014 for U.S. Appl. No. 13/010,976, of Babu, A. R., et al., filed Jan. 21, 2011.
Non-Final Office Action dated Jan. 20, 2015 for U.S. Appl. No. 14/012,655, of McKelvey, J., filed Aug. 28, 2013.
Examiner Requisition for Canadian Patent Application No. 2,813,237, dated Jan. 20, 2015.
Examiner Requisition for Canadian Patent Application No. 2,812,611, dated Jan. 22, 2015.
Examiner Requisition for Canadian Patent Application No. 2,812,251, dated Jan. 27, 2015.
Final Office Action dated Jan. 28, 2015 for U.S. Appl. No. 13/298,560, of Lamba, K., et al., filed Nov. 17, 2011.
Final Office Action dated Feb. 4, 2015 for U.S. Appl. No. 13/298,491, of Lamba, K., et al., filed Nov. 17, 2011.
Examiner Requisition for Canadian Patent Application No. 2,813,236, dated Feb. 17, 2015.
English-language translation of Decision of Refusal for Japanese Patent Application No. 2013-533897, dated Feb. 23, 2015.
Examiner Requisition for Canadian Patent Application No. 2,811,979, dated Feb. 23, 2015.
Examiner Requisition for Canadian Patent Application No. 2,812,594, dated Feb. 24, 2015.
Final Office Action dated Mar. 18, 2015 for U.S. Appl. No. 13/298,487, of Lamba, K, et al., filed Nov. 17, 2011.
Final Office Action dated Apr. 8, 2015 for U.S. Appl. No. 13/298,534, of Lamba, K., et al., filed Nov. 17, 2011.
Advisory Action dated Apr. 9, 2015 for U.S. Appl. No. 13/298,560, of Lamba, K, et al., filed Nov. 17, 2011.
Final Office Action dated May 6, 2015 for U.S. Appl. No. 13/298,501, of Babu, A., et al., filed Nov. 17, 2011.
Final Office Action dated May 6, 2015 for U.S. Appl. No. 13/298,506, of Lamba, K., et al., filed Nov. 17, 2011.
Final Office Action dated May 6, 2015 for U.S. Appl. No. 13/298,510, of Lamba, K. et al., filed Nov. 17, 2011.
Notice of Allowance dated May 19, 2015 for U.S. Appl. No. 14/620,765, of Wade, J., et al., filed Feb. 12, 2015.
Non-Final Office Action dated May 26, 2015 for U.S. Appl. No. 14/551,681, of Wade, J., et al., filed Nov. 24, 2014.
Notice of Allowance dated Jun. 22, 2015 for U.S. Appl. No. 13/298,491, of Lamba, K., et al., filed Nov. 17, 2011.
Non-Final Office Action dated Jul. 6, 2015 for U.S. Appl. No. 13/298,534, of Lamba, K., et al., filed Nov. 17, 2011.
Non-Final Office Action dated Jul. 16, 2015 for U.S. Appl. No. 13/298,560, of Lamba, K., et al., filed Nov. 17, 2011.
English-language translation of Office Action for Japanese Patent Application No. 2013-533895, dated Aug. 26, 2015.
Notice of Allowance dated Aug. 27, 2015, for U.S. Appl. No. 13/298,501, of Babu, A., et al., filed Nov. 17, 2011.
Notice of Allowance dated Aug. 28, 2015 for U.S. Appl. No. 13/298,510, of Lamba, K. et al., filed Nov. 17, 2011.

(56) References Cited

OTHER PUBLICATIONS

Notice of Allowance dated Sep. 1, 2015 for U.S. Appl. No. 13/298,487, of Lamba, K, et al., filed Nov. 17, 2011.
Notice of Allowance dated Sep. 2, 2015, for U.S. Appl. No. 14/578,107, of Wade, J. et al., filed Dec. 19, 2014.
English-language translation of Office Action for Japanese Patent Application No. 2013-533898, dated Sep. 9, 2015.
Advisory Action dated Sep. 11, 2015 for U.S. Appl. No. 13/298,506, of Lamba, K., et al., filed Nov. 17, 2011.
Notice of Allowance dated Sep. 16, 2015 for U.S. Appl. No. 14/551,681, of Wade, J., et al., filed Nov. 24, 2014.
English-language translation of Office Action for Japanese Patent Application No. 2013-533899, dated Sep. 30, 2015.
Notice of Allowance dated Oct. 6, 2015 for U.S. Appl. No. 13/298,491, of Lamba, K., et al., tiled Nov. 17, 2011.
Bauer, G.R., et al., "Comparing Block Cipher Modes of Operation on MICAz Sensor Nodes," 17th Euromicro International Conference on Parallel, Distributed and Network-based Processing, 2009, Feb. 18-20, 2009, pp. 371-378.
Lucks, S., "Two-Pass Authenticated Encryption Faster than Generic Composition," H. Gilbert and H. Handschuh (Eds.): FSE 2005, LNCS 3557, © International Association for Cryptologic Research 2005, pp. 284-298.
"What is a Coupling Capacitor," Retrieved from the Internet URL: http://www.learningaboutelectronics.com/Articles/What-is-a-coupling-capacitor, on Mar. 21, 2016, pp. 1-4.
Non-Final Office Action dated Sep. 30, 2011 for U.S. Appl. No. 12/903,753, of McKelvey, J., et al., filed Oct. 13, 2010.
Non-Final Office Action dated Sep. 30, 2011 for U.S. Appl. No. 13/005,822, of McKelvey, J., et al., filed Jan. 13, 2011.
Non-Final Office Action dated Sep. 30, 2011 for U.S. Appl. No. 13/010,976, of Babu, A. R., et al., filed Jan. 21, 2011.
Non-Final Office Action dated Oct. 7, 2011 for U.S. Appl. No. 13/043,258, of McKelvey, J., filed Mar. 8, 2011.
Non-Final Office Action dated Oct. 11, 2011 for U.S. Appl. No. 13/043,203, of McKelvey. J., et al., filed Mar. 8, 2011.
Non-Final office Action dated Oct. 11, 2011 for U.S. Appl. No. 13/043,263, of McKelvey, J., filed Mar. 8, 2011.
Final Office Action dated Jun. 12, 2012 for U.S. Appl. No. 13/010,976, of Babu, A. R., et al., filed Jan. 21, 2011.
Final Office Action dated Jul. 6, 2012 for U.S. Appl. No. 12/903,753, of McKelvey, J., et al., filed Oct. 13, 2010.
Final Office Action dated Jul. 6, 2012 for U.S. Appl. No. 13/043,203, of McKelvey. J., et al., filed Mar. 8, 2011.
Final Office Action dated Jul. 9, 2012 for U.S. Appl. No. 13/005,822, of McKelvey, J., et al., filed Jan. 13, 2011.
Final office Action dated Jul. 9, 2012 for U.S. Appl. No. 13/043,263, of McKelvey, J., filed Mar. 8, 2011.
Final Office Action dated Jul. 13, 2012 for U.S. Appl. No. 13/043,258, of McKelvey, J., filed Mar. 8, 2011.
Non-Final Office Action dated Jul. 19, 2012 for U.S. Appl. No. 12/903,758, of Wilson, M., et al., filed Oct. 13, 2010.
Advisory Action dated Aug. 1, 2012 for U.S. Appl. No. 13/043,203, of McKelvey, J., filed Mar. 2011
Advisory Action dated Aug. 15, 2012 for U.S. Appl. No. 13/043,258, of McKelvey, J., filed Mar. 8, 2011.
Advisory Action dated Aug. 16, 2012 for U.S. Appl. No. 13/043,263, of McKelvey, J., filed Mar. 8, 2011.
Advisory Action dated Aug. 17, 2012 for U.S. Appl. No. 13/005,822, of McKelvey, J.,et al., filed Jan. 13, 2011.
Advisory Action dated Aug. 24, 2012 for U.S. Appl. No. 13/010,976, of Babu, A. R., et al., filed Jan. 21, 2011.
Final Office Action dated Apr. 24, 2013 for U.S. Appl. No. 12/903,758, of Wilson, M., et al., filed Oct. 13, 2010.
Non-Final Office Action dated Apr. 25, 2013 for U.S. Appl. No. 13/298,491, of Lamba, K., et al., filed Nov. 17, 2011.
Non-Final Office Action dated Apr. 29, 2013 for U.S. Appl. No. 13/043,263, of McKelvey, J., filed Mar. 8, 2011.
Non-Final Office Action dated Apr. 29, 2013 for U.S. Appl. No. 131/298,487, of Babu, A., et al., filed Nov. 17, 2011.
Non-Final Office Action dated Apr. 30, 2013 for U.S. Appl. No. 13/043,203, of McKelvey, J., filed Mar. 8, 2011.
Non-Final Office Action dated May 28, 2013 for U.S. Appl. No. 13/298,560, of Lamba, K., et al., filed Nov. 17, 2011.
Non-Final Office Action dated Jun. 18, 2013 for U.S. Appl. No. 13/005,822, of McKelvey, J., et al., filed Jan. 13, 2011.
Non-Final Office Action dated Jul. 8, 2013 for U.S. Appl. No. 12/903,753, of McKelvey, J., et al., filed Oct. 13, 2010.
Notice of Allowance dated Jul. 9, 2013 for U.S. Appl. No. 13/043,203, of McKelvey, J., filed Mar. 8, 2011.
Notice of Allowance dated Aug. 6, 2013 for U.S. Appl. No. 12/903,758, of Wilson, M., et al., filed Oct. 13, 2010.
Final Office Action dated Aug. 15, 2013 for U.S. Appl. No. 13/043,263, of McKelvey, J., filed Mar. 8, 2011.
Final Office Action dated Aug. 22, 2013 for U.S. Appl. No. 13/298,487, of Babu, A., et al., filed Nov. 17, 2011.
Final Office Action dated Sep. 6, 2013 for U.S. Appl. No. 13/298,560, of Lamba, K., et al., filed Nov. 17, 2011.
Final Office Action dated Sep. 17, 2013 for U.S. Appl. No. 13/298,491, of Lamba, K., et al., filed Nov. 17, 2011.
Notice of Allowance dated Oct. 10, 2013, for U.S. Appl. No. 12/903,753, of Mckelvey, J., filed Oct. 13, 2010.
Advisory Action dated Oct. 21, 2013 for U.S. Appl. No. 13/298,560 of Lamba, K., et al., filed Nov. 17, 2011.
Advisory Action dated Oct. 22, 2013 for U.S. Appl. No. 13/298,487, of Babu, A., et al., filed Nov. 17, 2011.
Advisory Action dated Oct. 22, 2013 for U.S. Appl. No. 13/298,491, of Lamba, K., et al., filed Nov. 17, 2011.
Advisory Action dated Nov. 8, 2013 for U.S. Appl. No. 13/043,263, of McKelvey, J., filed Mar. 38, 2011.
Non-Final Office Action dated Nov. 21, 2013 for U.S. Appl. No. 14/052,009, of Wilson, M., et al., filed Oct. 11, 2013.
Non-Final Office Action dated Dec. 10, 2013 for U.S. Appl. No. 13/005,822 of McKelvey, J., et al., filed Jan. 13, 2011.
Non-Final Office Action dated Dec. 11, 2013 for U.S. Appl. No. 13/043,258, of McKelvey, J., filed Mar. 8, 2011.
Non-Final Office Action dated Feb. 24, 2014 for U.S. Appl. No. 13/043,263, of McKelvey, J., filed Mar. 8, 2011.
Non-Final Office Action dated Apr. 2, 2014 for U.S. Appl. No. 14/012,655, of McKelvey, J., filed Aug. 28, 2013.
Notice of Allowance dated Apr. 4, 2014 for U.S. Appl. No. 14/052,009, of Wilson, M., et al., filed Oct. 11, 2013.
English-language translation of Office Action for Japanese Patent Application No. 2013-533897, dated Jun. 5, 2014.
Non-Final Office Action dated Jun. 6, 2014 for U.S. Appl. No. 14/231,598, of Wade, J., et al., filed Mar. 31, 2014.
Notice of Allowance dated Jun. 24, 2014 for U.S. Appl. No. 13/005,822, of McKelvey, J., et al., filed Jan. 13, 2011.
Notice of Allowance dated Sep. 28, 2017, for U.S. Appl. No. 15/013,964, of Lamba, K, et al., filed Feb. 2, 2016.
Office Action for European Patent Application No. 11833172.7, dated Oct. 24, 2017.
English-language translation of Notification of Reasons for Refusal for Japanese Patent Application No. 2016-234281, dated Dec. 1, 2017.
English-language translation of Notification of Reasons for Refusal for Japanese Patent Application No. 2016-213566, dated Jan. 12, 2018.
Notice of Allowance dated Jan. 18, 2018, for U.S. Appl. No. 15/066,496, of Babu, A., et al., filed Mar. 10, 2016.
Notice of Allowance for Canadian Patent Application No. 2,811,979, dated Jan. 25, 2018.
Final Office Action dated Jan. 29, 2018, for U.S. Appl. No. 15/252,033, of Lamba, K, et al., filed Aug. 30, 2016.
Corrected Notice of Allowance dated Feb. 9, 2018, for U.S. Appl. No. 15/066,496, of Babu, A., et al., filed Mar. 10, 2016.
Examiner Requisition for Canadian Application No. 2,813,236, dated May 3, 2018.
International Search Report and Written Opinion for International Application No. PCT/US2010/052483, dated Jun. 10, 2011.
International Search Report and Written Opinion for International Application No. PCT/US2010/052481, dated Jun. 23, 2011.

(56) References Cited

OTHER PUBLICATIONS

International Search Report and Written Opinion for International Application No. PCT/US2011/055382, dated Dec. 28, 2011.
International Search Report and Written Opinion for International Application No. PCT/US2011/055394, dated Dec. 28, 2011.
International Search Report and Written Opinion for International Application No. PCT/US2011/055386, dated Feb. 22, 2012.
International Search Report and Written Opinion for International Application No. PCT/US2011/055402 dated Feb. 24, 2012.
International Search Report and Written Opinion for International application No. PCT/US2011/055387, dated Feb. 29, 2012.
International Search Report and Written Opinion for International Application No. PCT/US2011/055375, dated Mar. 2, 2012.
International Search Report and Written Opinion for International Application No. PCT/US2012/064782, dated Feb. 26, 2013.
English-language translation of Search Report for Japanese Patent Application No. 2013-533897, dated Apr. 14, 2014.
Supplementary European Search Report for European Patent Application No. 11833169.3, dated Apr. 17, 2014.
Supplementary European Search Report for European Patent Application No. 11833171.9, dated Apr. 17, 2014.
Supplementary European Search Report for European Patent Application No. 11833174.3, dated Apr. 17, 2014.
Supplementary European Search Report for European Patent Application No. 11833173.5, dated Apr. 17, 2014.
European Search Report for European Patent Application No. 11833172.7, dated Apr. 22, 2014.
International Search Report and Written Opinion for International Application No. PCT/US2014/069788, dated May 14, 2015.
English-language translation of Search Report in Japanese Patent Application No. 2013-533895, dated Jul. 23, 2015.
English-language translation of Search Report for Japanese Patent Application No. 2013-533899, dated Aug. 14, 2015.
English-language translation of Search Report for Japanese Patent Application No. 2013-533898, dated Aug. 26, 2015.
International Search Report and Written Opinion for International Application No. PCT/US2015/045772, dated Nov. 6, 2015.
Notice of Allowance dated Oct. 7, 2015 for U.S. Appl. No. 13/298,510, of Lamba, K., et al., filed Nov. 17, 2011.
Notice of Allowance dated Oct. 8, 2015 for U.S. Appl. No. 13/298,487, of Lamba, K., et al., filed Nov. 17, 2011.
Notice of Allowance dated Oct. 13, 2015 for U.S. Appl. No. 14/578,107, of Wade, J., et al., filed Dec. 19, 2014.
Notice of Allowance dated Nov. 13, 2015 for U.S. Appl. No. 13/298,487, of Lamba, K., et al., filed Nov. 17, 2011.
Corrected Notice of Allowance dated Nov. 18, 2015, for U.S. Appl. No. 14/578,107, of Wade, J., et al., filed Dec. 19, 2014.
Notice of Allowance dated Nov. 19, 2015 for U.S. Appl. No. 13/298,491, of Lamba, K., et al., filed Nov. 17, 2011.
Notice of Allowance dated Nov. 20, 2015 for U.S. Appl. No. 13/298,501, of Babu, A., et al., filed Nov. 17, 2011.
Non-Final Office Action dated Dec. 14, 2015 for U.S. Appl. No. 13/298,506, of Lamba, K., et al., filed Nov. 17, 2011.
Notice of Allowance for Canadian Patent Application No. 2,812,251, dated Jan. 5, 2016.
Notice of Allowance dated Jan. 12, 2016, for U.S. Appl. No. 13/298,534, of Lamba, K., et al., filed Nov. 17, 2011.
Corrected Notice of Allowance dated Jan. 29, 2016, for U.S. Appl. No. 13/298,534, of Lamba, K., et al., filed Nov. 17, 2011.
Final Office Action dated Feb. 1, 2016, for U.S. Appl. No. 13/298,560, of Lamba, K., et al., filed Nov. 17, 2011.
Notice of Allowance for Canadian Patent Application No. 2,812,611, dated Feb. 19, 2016.
English-language translation of Decision to Grant for Japanese Patent Application No. 2013-533895, dated Feb. 22, 2016.
Examiner Requisition for Canadian Patent Application No. 2,812,594, dated Feb. 26, 2016.
Examiner Requisition for Canadian Patent Application No. 2,811,979, dated Feb. 26, 2016.
Non-Final Office Action dated Mar. 1, 2016, for U.S. Appl. No. 14/942,515, of Lamba, K., et al., filed Nov. 16, 2015.
Examiner Requisition for Canadian Patent Application No. 2,813,236, dated Mar. 21, 2016.
Non-Final Office Action dated Apr. 7, 2016, for U.S. Appl. No. 13/298,506, of Lamba, K., et al., filed Nov. 17, 2011.
Advisory Action dated Apr. 14, 2016, for U.S. Appl. No. 13/298,560, of Lamba, K, et al., filed Nov. 17, 2011.
Non-Final Office Action dated May 5, 2016, for U.S. Appl. No. 14/306,041, of Wade, J., filed Jun. 16, 2014.
Notice of Allowance dated May 10, 2016, for U.S. Appl. No. 14/942,515, of Lamba, K., et al., filed Nov. 16, 2015.
Office Action for European Patent Application No. 11833172.7, dated May 17, 2016.
Office Action for European Patent Application No. 11833173.5, dated May 18, 2016.
Non-Final Office Action dated May 19, 2016, for U.S. Appl. No. 13/298,560, of Lamba, K., et al., filed Nov. 17, 2011.
Office Action for European Patent Application No. 11833174.3, dated May 19, 2016.
English-language translation of Office Action for Japanese Patent Application No. 2013-533899, dated Jun. 1, 2016.
English-language translation of Decision of Final Rejection for Japanese Patent Application No. 2013-533898, dated Jun. 29, 2016.
Notice of Acceptance for Australian Patent Application No. 2014362287, dated Jun. 30, 2016.
Non-Final Office Action dated Jun. 30, 2016 for U.S. Appl. No. 15/066,496, of Babu, A., et al., filed Mar. 10, 2016.
Non-Final Office Action dated Jul. 1, 2016, for U.S. Appl. No. 15/013,937, of Lamba, K., et al., filed Feb. 2, 2016.
Examiner Requisition for Canadian Patent Application No. 2,932,849, dated Jul. 13, 2016.
Notice of Allowance dated Aug. 26, 2016, for U.S. Appl. No. 13/298,506, of Lamba, K., et al., filed Nov. 17, 2011.
Notice of Allowance dated Sep. 27, 2016, for U.S. Appl. No. 14/306,041, of Wade, J., filed Jun. 16, 2014.
Notice of Allowance dated Oct. 26, 2016, for U.S. Appl. No. 15/013,937, of Lamba, K, et al., filed Feb. 2, 2016.
Final Office Action dated Nov. 3, 2016, for U.S. Appl. No. 13/298,560, of Lamba, K., et al., filed Nov. 17, 2011.
Notice of Allowance dated Dec. 19, 2016, for U.S. Appl. No. 14/306,041, of Wade, J., filed Jun. 16, 2014.
Non-Final Office Action dated Jan. 17, 2017, for U.S. Appl. No. 14/463,455, of Skoog, L., filed Aug. 19, 2014.
Non-Final Office Action dated Feb. 15, 2017, for U.S. Appl. No. 15/066,496, of Babu, A., et al., filed Mar. 10, 2016.
Advisory Action dated Feb. 21, 2017, for U.S. Appl. No. 13/298,560, of Lamba K, et al., filed Nov. 17, 2011.
English-language translation of Decision of Refusal for Japanese Patent Application No. 2013-533899, dated Feb. 22, 2017.
Examiner Requisition for Canadian Patent Application No. 2,811,979, dated Mar. 10, 2017.
Notice of Allowance for Canadian Patent Application No. 2,932,849, dated Mar. 27, 2017.
Examiner Requisition for Canadian Patent Application No. 2,813,236, dated Apr. 20, 2017.
Non-Final Office Action dated May 8, 2017, for U.S. Appl. No. 15/013,964, of Lamba, K., et al., filed Feb. 2, 2016.
Notice of Allowance dated Jun. 22, 2017, for U.S. Appl. No. 14/463,455, of Skoog, L., filed Aug. 19, 2014.
Non-Final Office Action dated Jul. 28, 2017, for U.S. Appl. No. 15/252,033, of Lamba, K., et al., filed Aug. 30, 2016.
Summons to attend Oral Proceedings for European Patent Application No. 11833173.5, dated Aug. 2, 2017.
English-language translation of First Office Action and Search for Chinese Patent Application No. 201510109013.7, dated Sep. 5, 2017.
Ex Parte Quayle Action mailed Sep. 8, 2017, for U.S. Appl. No. 15/066,496, of Babu, A., et al., filed Mar. 10, 2016.
"2.5mm Headset Jack," Retrieved from the Internet URL: http://www.phonescoop.com/glossary/term.php?gid=360, on May 5, 2011, pp. 1-1.

(56) References Cited

OTHER PUBLICATIONS

"A Magnetic Stripe Reader—Read Credit Cards & Driver Licences!," Articlesbase (articlesbase.com), Sep. 7, 2009, Retrieved from the Internet URL: http://www.articlesbase.com/electronics-articlesta-magnetic-stripe-reader-read-credit-cards- . . . , on Feb. 8, 2011, pp. 1-3.
"Announcement: Semtek Introduces Side Swipe II Card Reader for Wireless Devices," Brighthand, Retrieved from the Internet URL: http://forum.brighthand.com/pdas-handhelds/173285-announcement-semtek-introduces-sid . . . , on Apr. 19, 2011, pp. 1-2.
"Arduino magnetic stripe decoder," Instructables, Retrieved from the Internet URL: http://www.instructables.com/id/Arduino-magneticstripe-decorder/, on Feb. 8, 2011, pp. 1-5.
"Credit Card Swiper and Reader for iPhone, iPad, Blackberry, Android and more," Retrieved from the Internet URL: http://hubpages.com/hub/Credit-Card-Swiper-and-Reader-for-iPhone-iPad-Blackberry-An . . . , on Apr. 20, 2011, pp. 1-2.
"Get paid on the spot from your mobile phone," Retrieved from the Internet URL: http://payments.intuit.com/products/basic-payment-solutions/mobile-credit-card-processin . . . , on Feb. 11, 2011, pp. 1-3.
"Headphone Jack (3.5mm)," Retrieved from the Internet URL: http://www.phonescoop.com/glossary/term.php? gid=440, on May 5, 2011, pp. 1-1.
"Magnetic Card Reader," lekernel.net~scrapbook, Retrieved from the Internet URL: http://lekernel.net/scrapbook/old/cardreader.html, on Apr. 25, 2011, pp. 1-4.
"Magnetic Stripe Reader (MSR) MSR7000-100R," Motorola Solutions, Retrieved from the Internet URL: http://www.motorola.com/business/US-EN/MSR7000-100R_US-EN.do?vgnextoid=164fc3 . . . , on Feb. 8, 2011, pp. 1-1.
"Magnetic stripe reader/writer," Retrieved from the Internet URL: http://www.gae.ucm.es/-padilla/extrawork/stripe.html, on Dec. 21, 2009, pp. 1-2.
"Mag-stripe readers the hunt for a homebrew mag-stripe reader that'll work with modern," Jan. 16, 2009, Retrieved from the Internet URL: http://www.hak5.org/forums/index.php?showtopic=11563&st=20, on Apr. 25, 2011, pp. 1-6.
"Mophie Marketplace Magnetic Strip Reader/Case for iPhone 3G & 3GS—Grey," J&R (JR.com), Retrieved from the Internet URL: http://www.jr.com/mophie/pe/MPE_MPIP3GBLK/, on Feb. 8, 2011, pp. 1-1.
"MSR500EX (Mini123EX) Portable Magnetic Stripe Card Reader," Tyner, Apr. 27, 2007, Retrieved from the Internet URL: http://www.tyner.com/magnetic/msr500ex.htm, on Apr. 22, 2011, pp. 1-3.
"Pay@PC," Retrieved from the Internet URL: http://www.merchantanywhere.com/PAY_AT_PCT@PC.htm, on Feb. 11, 2011, pp. 1-2.
"Reference Designations for Electrical and Electronics Parts and Equipment, Engineering Drawing and Related Documentation Practices," ASME Y14.44-2008, The American Society of Mechanical Engineers, Nov. 21, 2008, pp. 1-31.
"Semtek 3913 Insert Magnetic Card Reader 20 Pin Serial RS232," Product description, RecycledGoods.com, Retrieved from the Internet URL: http://www.recycledgoods.com/products/Semtek-3913-Insert-Magnetic-Card-Reader-20-Pi . . . , on Apr. 19, 2011, pp. 1-3.
"Semtek to target healthcare with HandEra PDAs and PDA swipe card reader," Aug. 29, 2001, Retrieved from the Internet URL: http://www.pdacortex.com/semtek.htm, on Apr. 19, 2011, pp. 1-2.
"Touch-Pay Wireless Credit Card Processing," MerchantSeek, Retrieved from the Internet URL: http://www.merchantseek.com/wireless-credit-card-processing.htm, on Feb. 11, 2011, pp. 1-5.
"Travel industry targeted for Palm PDA card reader," Retrieved from the Internet URL: http://www.m-travel.com/news/2001/08/travel_industry.html, on Apr. 19, 2011, pp. 1-2.
"USB Magnetic Stripe Credit/Card Track-2 Reader and Writer (75/210BPI)," Deal Extreme (dealextreme.com), Nov. 15, 2008, Retrieved from the Internet URL: http://www.dealextreme.com/p/usb-magnetic-stripe-credit-debit-card-track-2-reader-and-wr . . . , on Feb. 8, 2011, pp. 1-3.
Acidus, "Mag-stripe Interfacing—A Lost Art," Retrieved from the Internet URL: http://www.scribd.com/doc/18236182/Magstripe-Interfacing#open_ . . . , on Feb. 7, 2011, pp. 1-4.
Bourdeauducq, S., "Reading magnetic cards (almost) for free" ("Lekernel"), Jan. 26, 2009, Retrieved from the Internet URL: http://lekernel.net/blog/?p=12, on May 5, 2011, pp. 1-2.
Buttell, A.E., "Merchants eye mobile phones to transact card payments," Feb. 3, 2010, Retrieved from the Internet URL: http://www.merchantaccountguide.com/merchant-account-news/cell-phone-credit-card-mer . . . , on Feb. 8, 2011, pp. 1-3.
Harris, A., "Magnetic Stripe Card Spoofer," Aug. 4, 2008, Retrieved from the Internet URL: http://hackaday.com/2008/08/04/magnetic-stripe-card-spoofer/, on Apr. 25, 2011, pp. 1-11.
Jones, R., "U.S. Credit Cards to get a high-tech makeover," Oct. 22, 2010, Retrieved from the Internet URL: http://lifeine.today.com/_news/2010/10/22/5334208-us-credit-cards-to-get-a-high-tech-mak . . . , on Feb. 8, 2011, pp. 1-8.
Kuo, Y-S et al., "Hijacking Power and Bandwidth from the Mobile Phone's Audio Interface," Proceedings of the First ACM Symposium on Computing for Development, (DEV'10), Dec. 17, 2010, pp. 1-10.
Padilla, L. "The simplest magnetic stripe reader," Jan. 27, 2003, Retrieved from the Internet URL: www.gae.ucm.es~padilla/extrawork/soundtrack.html, on Dec. 21, 2009, pp. 1-5.
Padilla, L., "Magnetic stripe reader circuit," Jan. 28, 1997, Retrieved from the Internet URL: http://www.gae.ucm.es/~padilla/extraworklmagamp.html, on May 5, 2011, pp. 1-7.
Padilla, L., "Turning your mobile into a magnetic stripe reader," Retrieved from the Internet URL: http://www.gae.ucm.es/~padilla/extrawork/mobilesoundtrack.html, on Feb. 7, 2011, pp. 1-4.
Ryan, P., "Plug and Pay: A Gallery of 26 Mobile Card Readers," Aug. 20, 2013, Retrieved from the Internet URL: http://bankinnovation.net/2013/08/plug-and-pay-a-gallery-of-26-mobile-card-readers/, on Feb. 19, 2015, pp. 1-12.
Titlow, J.P., "ROAM pay is like Square for Blackberry (Plus Android, iOS and Desktops)," Dec. 1, 2010, Retrieved from the Internet URL: http://www.readwriteweb.com/biz/2010/12/roampay-is-like-square-for-bla.php, on Apr. 20, 2011, pp. 1-12.
Veneziani, V., "Use a cellphone as a magnetic card reader," Apr. 15, 2005, Retrieved from the Internet URL: http://hackaday.com/2005/04/15/use a-cellphone-as-a-magnetic-card . . . , on Feb. 7, 2011, pp. 1-10.
Website: www.alexwinston.com, Aug. 31, 2009, pp. 1-5.
Examiner Requisition for Canadian Patent Application No. 2,812,594, dated Jun. 19, 2018.
Notice of Allowance darted Jul. 6, 2018, for U.S. Appl. No. 15/252,033, of Lamba, K., et al., filed Aug. 30, 2016.
English-language translation of Notification to Grant for Chinese Patent Application No. 201510109013.7, dated Aug. 3, 2018.
English-language translation of Decision of Refusal for Japanese Patent Application No. 2016-234281, dated Aug. 17, 2018.
English-language translation of Decision of Refusal for Japanese Patent Application No. 2016-213566, dated Sep. 18, 2018.

* cited by examiner

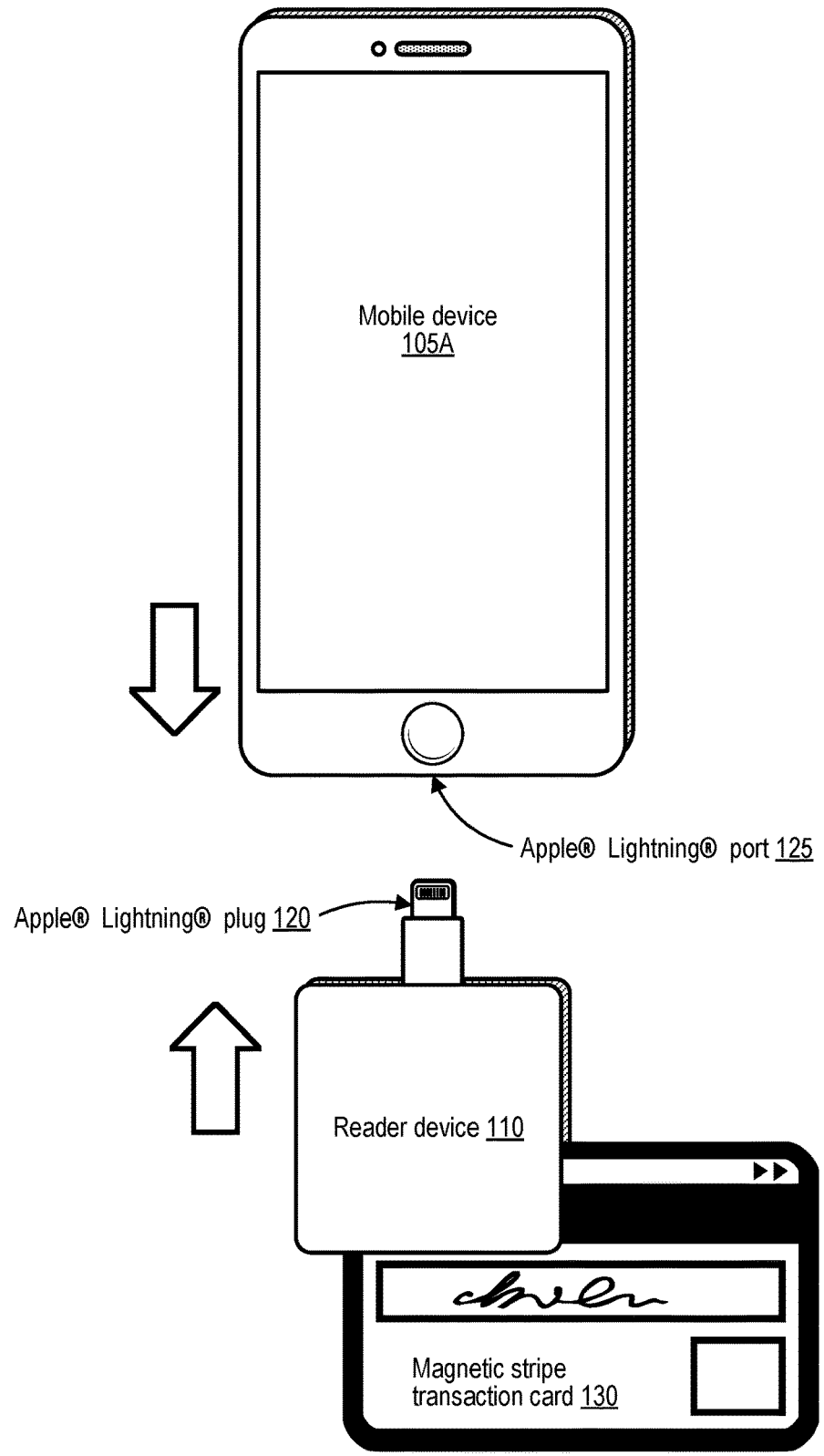

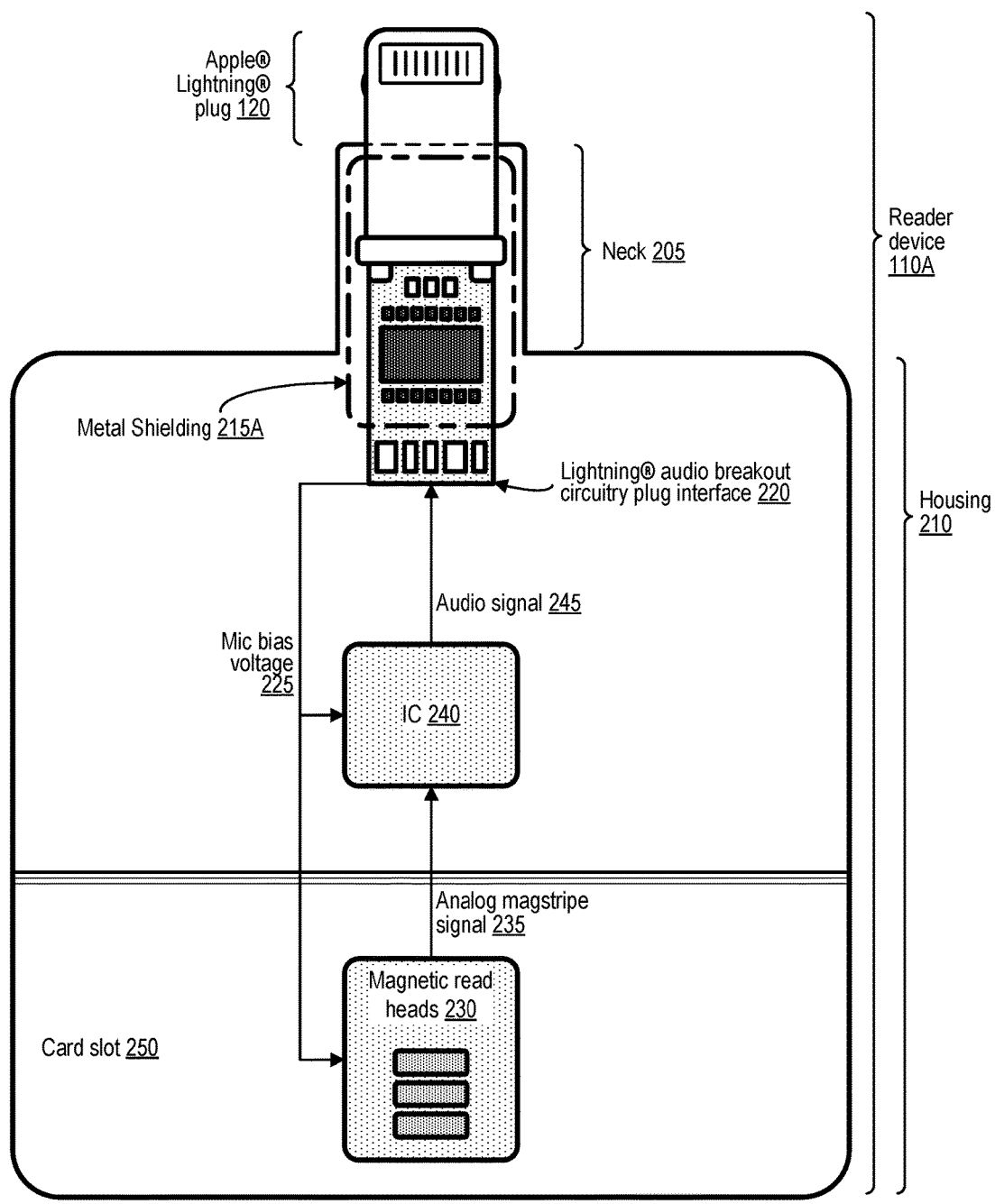

TRANSACTION OBJECT READER WITH DIGITAL SIGNAL INPUT/OUTPUT AND INTERNAL AUDIO-BASED COMMUNICATION

BACKGROUND

Point of sale (POS) terminals allow customers to easily pay merchants, and typically include a card reader, such as the magnetic stripe card reader or a Europay/Mastercard/Visa (EMV) integrated circuit (IC) chip card reader. POS terminals also typically include a computer and a network interface through which the computer can communicate the information read from the card to a payment server that then authorizes and completes the transaction.

Portable POS terminals sometimes use an existing mobile device, such as a smartphone, to fill the role of the computer and network interface, where a separate card reader device communicates with the mobile device.

Increasingly, mobile devices are manufactured to be as small as possible and with as few ports as possible. Most modern mobile devices only include a single port—either a Universal Serial Bus Type C (USB-C) port or an Apple® Lightning® port.

There is a need for card reader devices with USB-C plugs and Apple® Lightning® plugs.

BRIEF DESCRIPTION OF THE DRAWINGS

FIG. 1A illustrates a magstripe card reader with an Apple® Lightning® plug to be plugged into an Apple® Lightning® port of a mobile device.

FIG. 2A illustrates a cross-section view of a magstripe card reader with an Apple® Lightning® plug and an audio breakout circuitry connector interface.

DETAILED DESCRIPTION

A card reader includes a digital connector such as a Universal Serial Bus (USB) plug or an Apple® Lightning® plug. The digital connector includes a corresponding connector interface, which provides voltage to at least a card reader interface and an integrated circuit (IC) of the card reader. The card reader interface outputs an analog transaction information signal upon reading the card. The IC generates a digital version of the analog transaction information signal, encrypts the digital version, converts that into an analog audio signal. The audio signal can then be sent to the connector interface, which converts it into a digital signal such as a USB or Apple® Lightning® signal that is sent by the digital connector to a mobile device. Alternately, the audio signal can be sent to a microcontroller that converts the audio signal to a digital format such as USB, and then to the digital connector.

FIG. 1A illustrates a magstripe card reader with an Apple® Lightning® plug to be plugged into an Apple® Lightning® port of a mobile device.

In particular, FIG. 1A illustrates a card reader device 110 with an Apple® Lightning® plug 120 as well as a mobile device 105A with an Apple® Lightning® port 125. A magnetic stripe transaction card 130 is illustrated partially inside a card slot of the reader device 110.

White block arrows to the left of the card reader device 110 and the mobile device 105A indicate that the plug 120 is meant to enter the port 125.

Figure 1B:
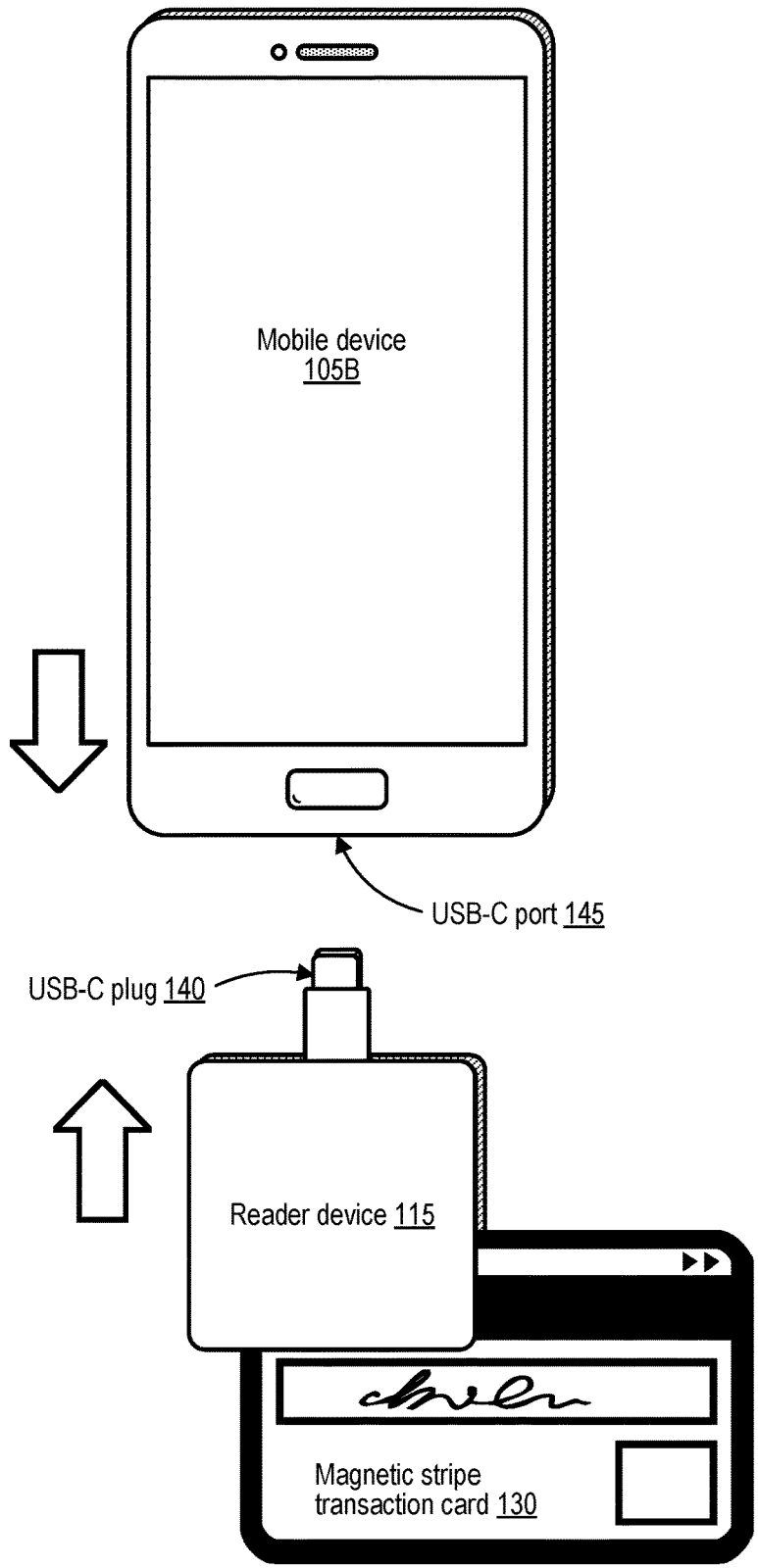
FIG. 1B illustrates a magstripe card reader with a Universal Serial Bus Type-C (USB-C) plug to be plugged into a USB-C port of a mobile device.

FIG. 1B illustrates a magstripe card reader with a Universal Serial Bus Type-C (USB-C) plug to be plugged into a USB-C port of a mobile device.

In particular, FIG. 1B illustrates a card reader device 115 with USB-C plug 140 as well as a mobile device 105A with an USB-C port 145. A magnetic stripe transaction card 130 is illustrated partially inside a card slot of the reader device 115. While a USB-C plug 140 and port 145 are illustrated in FIG. 1B, it should be understood that other corresponding types of plugs and ports following other USB standards may be used, such as USB Type A, USB Type B, USB Mini-A, USB Micro-A, USB Mini-B, USB Micro-B, or some combination thereof. Each of the USB plug 140 and port 145 may optionally be USB on-the-go compliant.

White block arrows to the left of the card reader device 115 and the mobile device 105A indicate that the plug 140 is meant to enter the port 145.

The term "connector" as used herein may refer to a plug, a port, a cable, or a wireless transceiver.

Figure 1C:
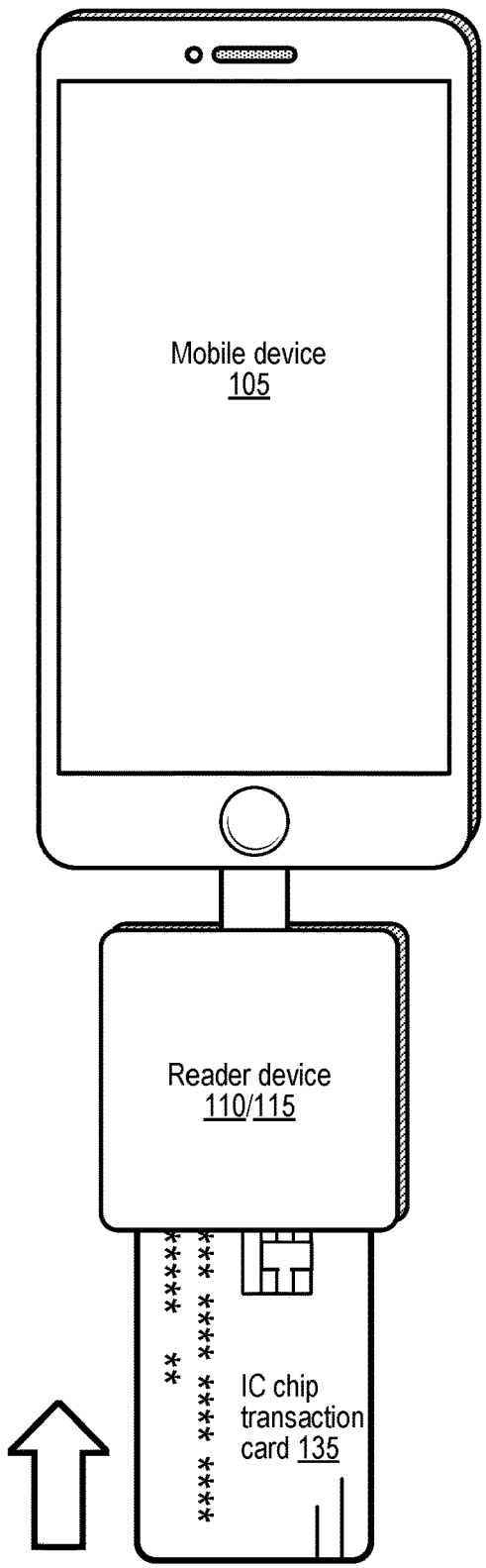
FIG. 1C illustrates an integrated circuit (IC) chip card reader plugged into a mobile device via Apple® Lightning® connectors or USB-C connectors.

FIG. 1C illustrates an integrated circuit (IC) chip card reader plugged into a mobile device via Apple® Lightning® connectors or USB-C connectors.

The mobile device 105 and reader device 110/115 of FIG. 1C may be any of the types discussed with respect to FIGS. 1A-1B. That is, the mobile device 105 of FIG. 1C may be either a mobile device 105A with an Apple® Lightning® port 125 as in FIG. 1A or a mobile device 105B with a USB port 145 as in FIG. 1B. Likewise, the reader device 110/115 of FIGURE C may include an Apple® Lightning® plug 120 as in FIG. 1A or a USB plug 140 as in FIG. 1B.

The reader device 110/115 of FIG. 1C includes an IC chip card reader instead of or in addition to the magstripe card reader illustrated in FIG. 1A and FIG. 1B. The IC chip card reader can read transaction information from an IC chip of an IC chip transaction card 135. Smartcard chips and Europay/Mastercard/Visa (EMV) chips are types of IC chips. A white block arrow to the left of the IC chip transacting card 135 indicate that the IC chip transaction card 135 is meant to be inserted into a transaction card slot at the bottom of the reader device 110/115 as oriented in FIG. 1C. That is, the transaction card slot is located along a surface opposite to a surface from which the neck 205 and plug 120/140 protrude.

The IC chip card reader may be located along a surface of the same slot as the magstripe read head(s). If the same slot is used, the IC chip card reader can be disposed along an opposite surface of the same slot in comparison to the magstripe read head(s) since transaction card that include both an IC chip and a magnetic stripe typically include them on opposite sides of the transaction card. Alternately, the IC chip card reader can be disposed along the same surface of the same slot as the magstripe read head(s), which may simplify the internal electronics/construction of the reader device 110/115, for example by allowing both the IC chip card reader and the magstripe read head(s) to be located along a single surface of a single printed circuit board (PCB). Alternated, the reader device 110/115 may include an IC chop card reader and/or magstripe read head on each of the two surfaces along the slot, to make sure that a transaction card is read no matter which direction it is inserted into or slid through the slot.

Alternately, the reader device 110/115 may include two slots—one for the magstripe read head(s) and one for the IC chip card reader. The planar interior of these slots, and the planar surfaces of the reader device 110/115 along each of these slots, may be parallel to each other. If two slots are included, the magstripe read head(s) and IC chip card reader may be disposed along opposite sides of the same PCB, where at least a portion of the PCB may be in the "wall" space between the two slots.

Figure 6:
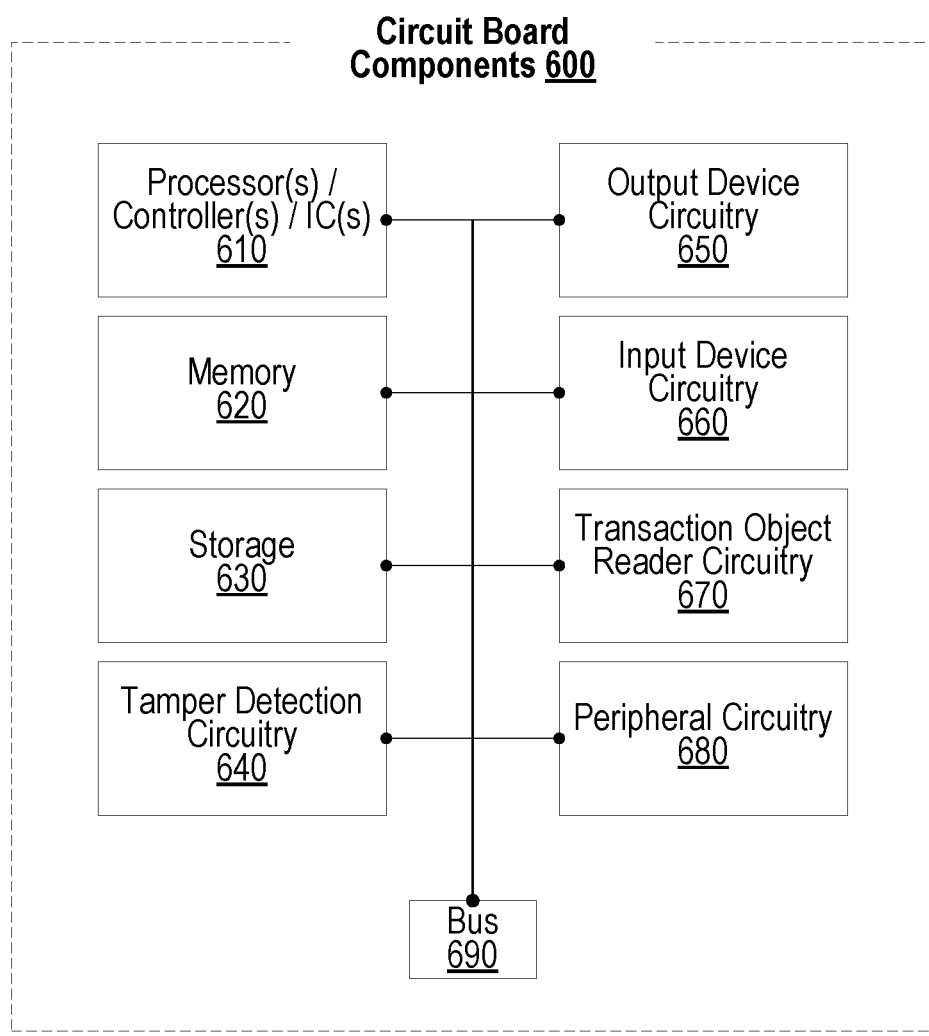
FIG. 6 is a block diagram of exemplary components that may be present on the circuit board.

Both the magstripe read heads and IC chip card reader are further described with respect to the transaction object reader circuitry 670 of FIG. 6.

Figure 1D:
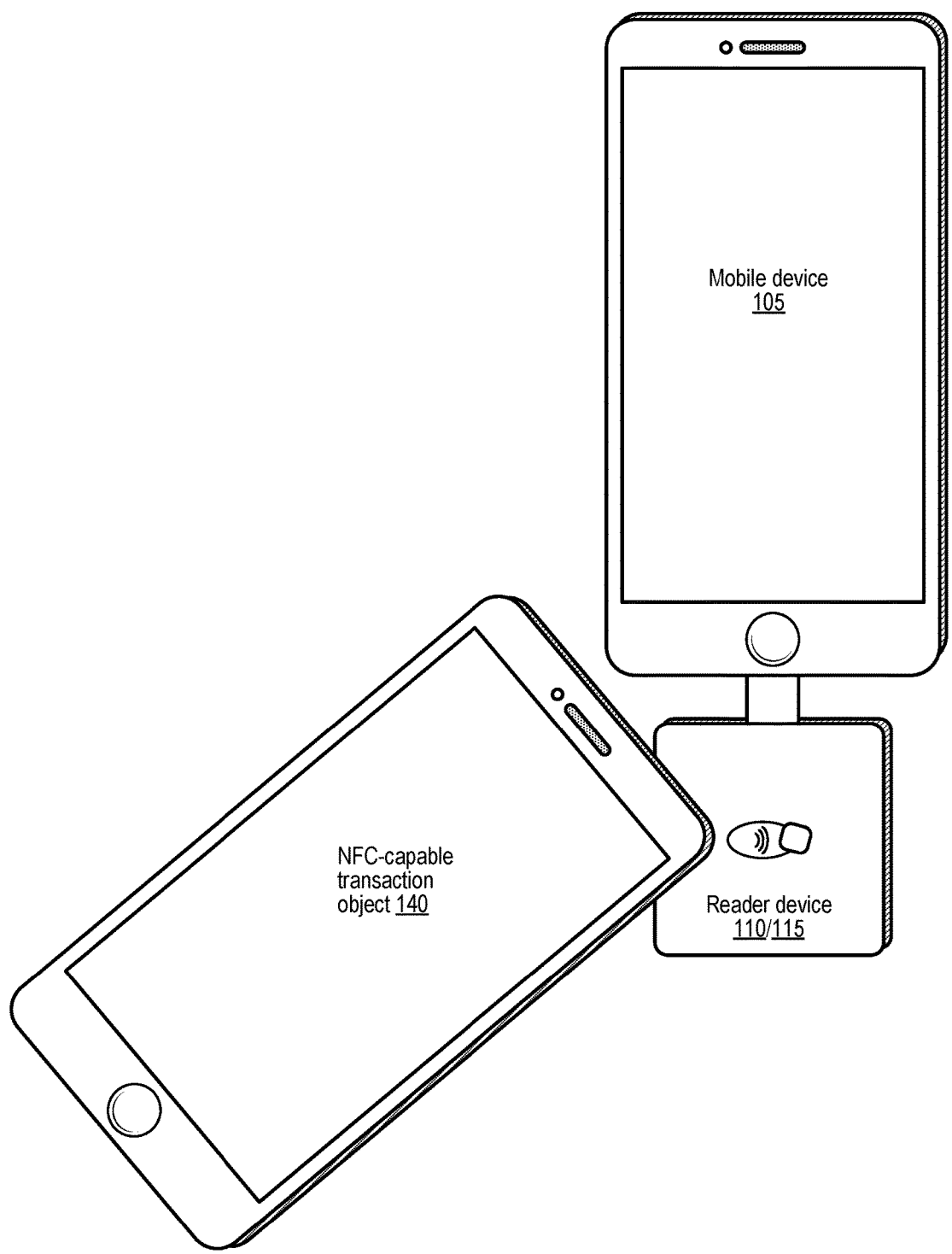
FIG. 1D illustrates a near field communication (NFC) object reader plugged into a mobile device via Apple® Lightning® connectors or USB-C connectors.

FIG. 1D illustrates a near field communication (NFC) object reader plugged into a mobile device via Apple® Lightning® connectors or USB-C connectors.

The mobile device 105 and reader device 110/115 of FIG. 1D may be any of the types discussed with respect to FIGS. 1A-1C.

The reader device 110/115 of FIG. 1D includes an NFC object reader that reads transaction information wirelessly from the NFC-capable transaction object 140 of FIG. 1D, which is illustrated as another mobile device similar to the mobile device 105. The NFC-capable transaction object 140 may alternately be an NFC-capable transaction card similar to the cards 130 and 135 of FIGS. 1A-1C, or may be a wearable device such as a smartwatch, bracelet, ring, glasses, or other fashion accessory.

The reader device 110/115 of FIG. 1D may include the NFC reader instead of or in addition to either or both of the magstripe read head(s) and/or IC chip card reader(s) illustrated and discussed with respect to FIGS. 1A-1C.

The NFC transaction object reader is further described with respect to the transaction object reader circuitry 670 of FIG. 6.

FIG. 2A illustrates a cross-section view of a magstripe card reader with an Apple® Lightning® plug and an audio breakout circuitry connector interface.

The card reader device 110A of FIG. 2A includes a housing 210 and a neck 205 extending from a surface of the housing 210. An Apple® Lightning® plug 120 extends from the neck 205. A portion of the plug 120 is hidden within the neck 205. The plug 120 includes an attached Apple® Lightning® audio breakout circuitry 220, which functions as connector interface for the Apple® Lightning® plug connector 120.

The Apple® Lightning® audio breakout circuitry 220 pulls out analog audio signals from digital data received via the Apple® Lightning® plug 120, for example via a digital-to-analog converter (DAC). The Apple® Lightning® audio breakout circuitry 220 also receives analog audio signals and converts them into digital data that the Apple® Lightning® plug 120 can output, for example via an analog-to-digital converter (ADC).

A direct current (DC) microphone bias voltage 225, ordinarily intended to power microphones at approximately two to three volts, is pulled from the Apple® Lightning® audio breakout circuitry 220 in the card reader device 110A of FIG. 2A. The microphone bias voltage 225 is used to power magnetic read heads 230 used for reading a magnetic stripe. Three read heads 230 are included to read all three tracks of the magnetic stripe simultaneously as the card is swiped through the card slot 250. The microphone bias voltage 225 is used to power an integrated circuit (IC) 240, which is illustrated in more detail in FIG. 4.

When a magnetic stripe card 130 is swiped through the card slot 250, the magnetic read heads 230 read the magnetic stripe of the card 130 and produce an analog magnetic stripe signal 235, which is passed over to the IC 240. The IC 240 receives the analog magnetic stripe signal 235. As illustrated and discussed in more detail with respect to FIG. 4, the IC 240 generates a digital version of the analog magnetic stripe signal 235 via amplifiers and ADCs. The IC 240 then converts the resulting binary into an alphanumeric American Standard Code for Information Interchange (ASCII) string, and encrypts the this ASCII string. The IC 240 then turns the encrypted digital version of the analog magnetic stripe signal 235 into an audio signal 245. The Apple® Lightning® audio breakout circuitry 220 then receives the audio signal 245, generally via a microphone audio input node of the Apple® Lightning® audio breakout circuitry 220.

The Apple® Lightning® audio breakout circuitry 220 then converts the audio signal 245 into a digital Apple® Lightning® signal and sends it from the Apple® Lightning® plug 120 to the Apple® Lightning® port 125 of the mobile device 105A. The mobile device 105A can then use Wi-Fi, WLAN, a cellular network, or any other network discussed with respect to FIG. 6 to contact an appropriate server given the type of card that was read—that is, credit, debit, transit, or any of the other types of card or transaction objects discussed with respect to the transaction object reader circuitry 670 of FIG. 6. The server then responds to the mobile device 105A with a confirmation that the transaction was completed, optionally after additional authorizations or verifications are performed between the mobile device 105A and the server, authorizing and/or verifying the mobile device 105, the card 130, and/or the card reader 110.

A metal shielding 215A, drawn only as a dashed outline in FIGS. 2A-2C and FIGS. 3A-3B, is optionally included within the neck 205 and extending into a portion of the housing 210. The metal shielding 215A protects a portion of the plug 120 and a portion of the plug interface 220. The metal shielding 215 may optionally include non-conductive material on an inner surface to avoid causing a short-circuit, particularly at any of the exposed conductive nodes of the plug interface 220. The metal shielding 215 may optionally include a glue or other adhesive, or one or more clips, to help keep the plug 120 fastened to the plug interface 220.

Figure 2B:
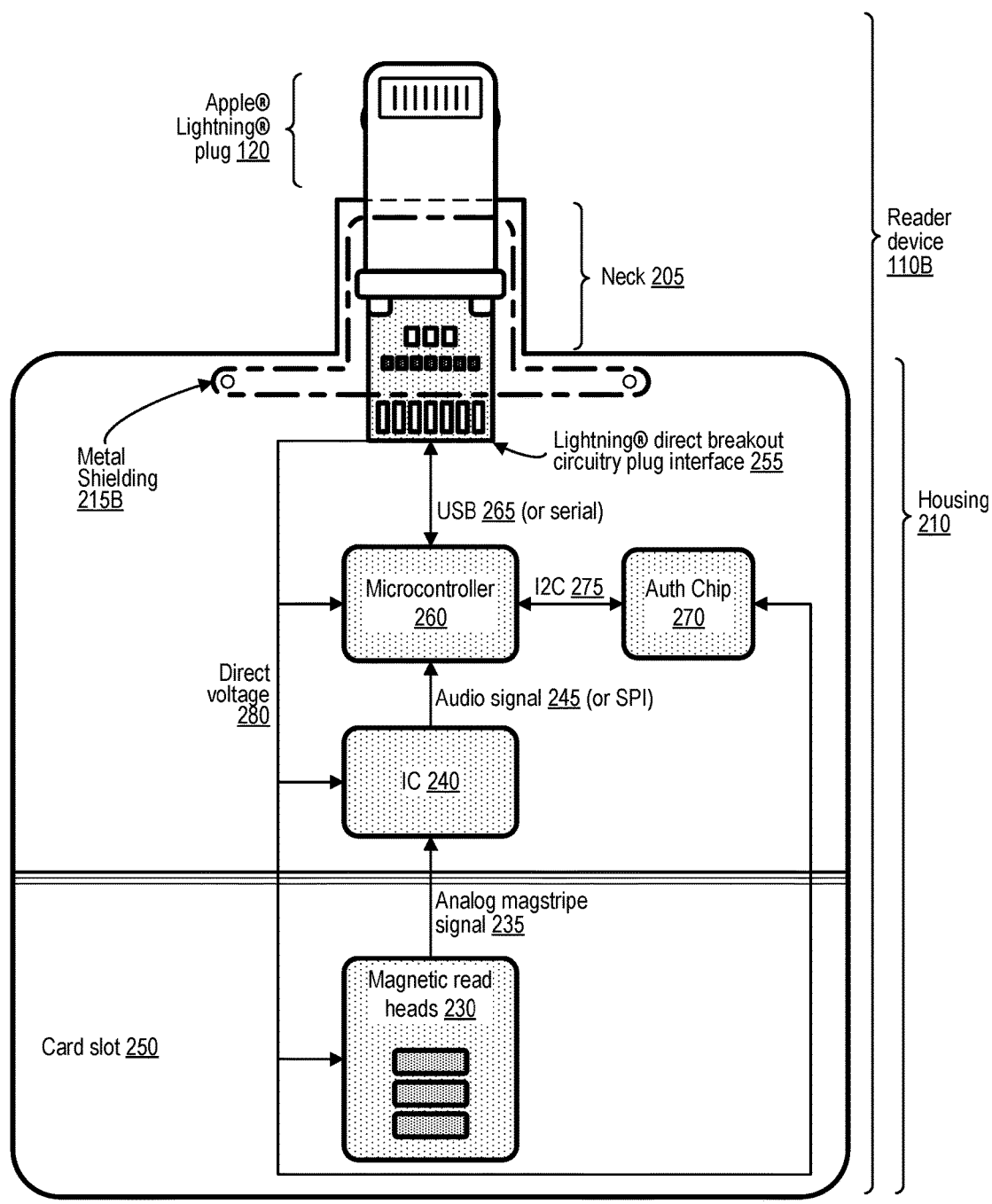
FIG. 2B illustrates a cross-section view of a magstripe card reader with an Apple® Lightning® plug and a microcontroller and authorization chip.

FIG. 2B illustrates a cross-section view of a magstripe card reader with an Apple® Lightning® plug and a microcontroller and authorization chip.

The reader device 110B of FIG. 2B is slightly different than the reader device 110A of FIG. 2A mainly in that the plug interface 255 in the reader device 110B of FIG. 2B is a direct breakout circuitry plug interface 255 that stays in digital rather than switching over to analog audio like the plug interface 220 of FIG. 2A.

This plug interface 255 still provides a voltage 280, which like in FIG. 2A, is used to power the magnetic read heads 230 and the IC 240. These components function similarly to how they did previously, though the IC 240 can now output either the audio signal 245 that it did in FIG. 2A or it can output a digital Serial Peripheral Interface (SPI) signal.

The voltage 280 is also used to power a microcontroller 260 and an authorization chip 270 in the reader device 110B of FIG. 2B. The microcontroller 260 receives the output of the IC 240 and converts it into either a Universal Serial Bus (USB) 265 signal or an Apple® serial signal, depending on what the plug interface 255 accepts. The microcontroller 260 may be, for example a Texas Instruments TI-MSP430 microcontroller.

The authorization chip 270 is a chip provided by Apple® that provides "Made for iPod/iPhone" (MFI) licensing authorization. Generally, the audio breakout plug interface 120 of FIG. 2A includes the authorization chip 270 as part of the plug interface 120, though the more direct digital plug interface 255 of FIG. 2B requires the authorization chip to be present separately. The authorization chip 270 communicates via Inter-Integrated Circuit (I2C).

Another difference between FIG. 2A and FIG. 2B is that the reader device 110B of FIG. 2B includes a different metal shielding 215B. The metal shielding 215B of FIG. 2B is, at the portion that is in the housing 210, flared out to be wider than the neck 205. This prevents the metal shielding 215B, and the plug 120 and plug interface 255 that it protects, from being accidentally pulled out of the neck 205 when a pulling force is applied, for example when a user is unplugging the reader device 110B from their mobile device 105A. The metal shielding 215B of FIG. 2B also appears to include mounting holes at the end of the flared out portions, allowing the metal shielding 215B to be screwed or otherwise securely affixed to the housing 210.

Figure 2C:
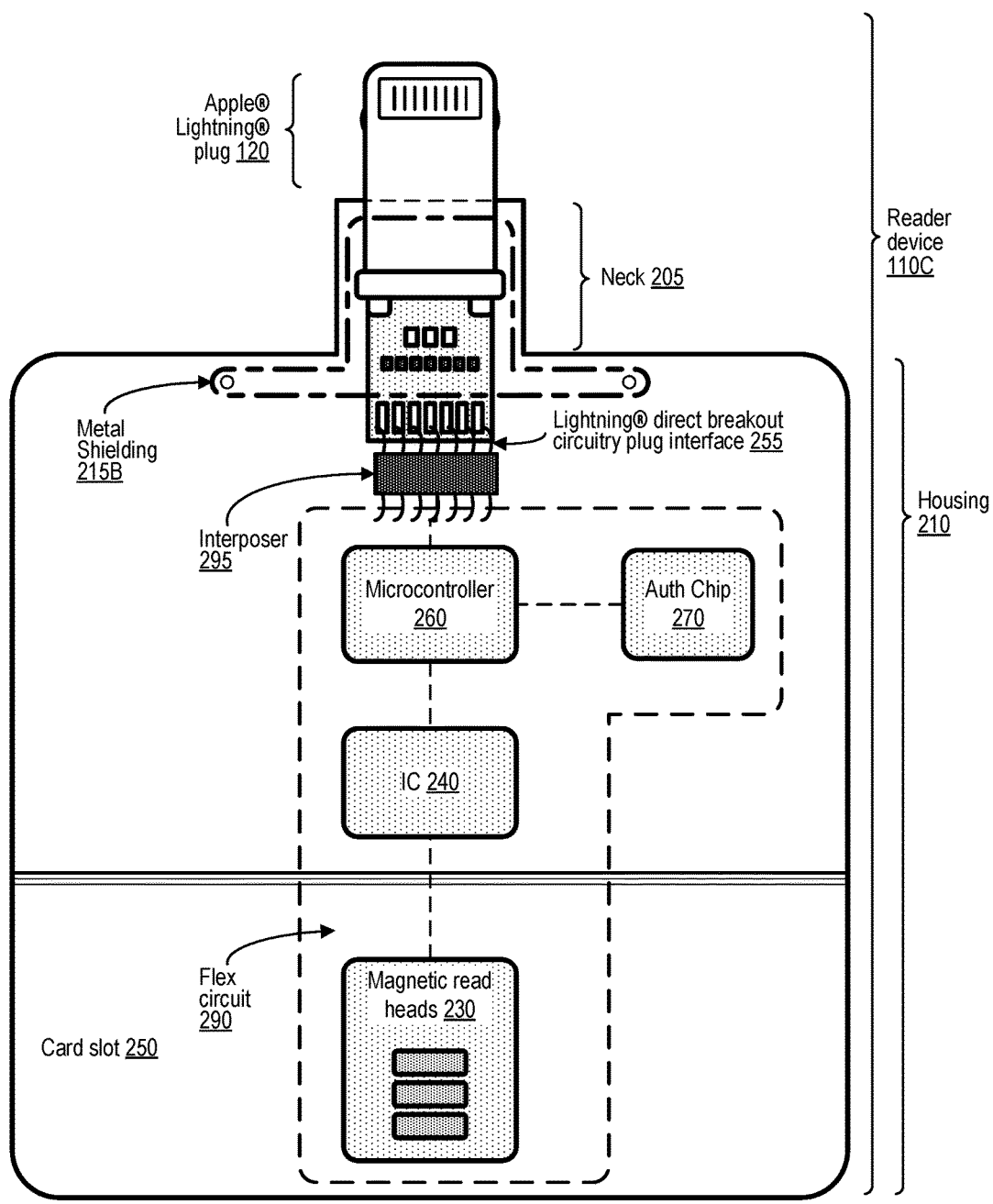
FIG. 2C illustrates a cross-section view of a magstripe card reader with an Apple® Lightning® plug, a flex circuit, and an interposer.

FIG. 2C illustrates a cross-section view of a magstripe card reader with an Apple® Lightning® plug, a flex circuit, and an interposer.

The reader device 110C of FIG. 2C is almost identical to the reader device 110B of FIG. 2B. In the reader device 110C of FIG. 2C, however, the magnetic read heads 230, the IC 240, the microcontroller 260, and the authorization chip 270 are all located on a single flex circuit 290. This allows the reader device 110C to be very compact, to keep cool by allowing more airflow, and more organized.

Additionally, the reader device 110C of FIG. 2C connects the flex circuit 290 to the plug interface 255 via an interposer block 295 in between. Use of the interposer block 295 here offers technical benefits over alternatives. Soldering wires from the flex circuit 290 to the plug interface 255 fills up a lot of space within the reader device 110C, which contributes to overheating and leaves the interior tangled and difficult to repair, not to mention time-consuming and difficult to solder and wire at such small scales to begin with. Soldering the flex circuit 290 directly to the plug interface 255 saves space and is neat if done correctly, but is also difficult to repair, and there is no good way to check if solder joints are successful that way. Use of the interposer block 295 solves these issues, making construction and repairs and solder joint inspection easy. Use of the interposer block 295 also provides some mechanical benefits. That is, if the interposer block 295 is affixed or anchored to the housing, it can provide more stability and can help ensure that the plug 120, plug interface 255, and metal shielding 215B cannot move more than they should. On the other hand, if the interposer block 295 is not affixed or anchored to the housing, it can provide more flexibility for the flex circuit 290 and can prevent it from tearing under stress by giving it a little more space to move.

While the reader device 110C of FIG. 2C illustrates the magnetic read heads 230, the IC 240, the microcontroller 260, and the authorization chip 270 all located on a single flex circuit 290, in a different reader device 110/115, any subset or combination of these components, or any other components discussed with respect to FIG. 6, may be on one or more flex circuits 290 within that particular reader device 110/115.

Figure 3A:
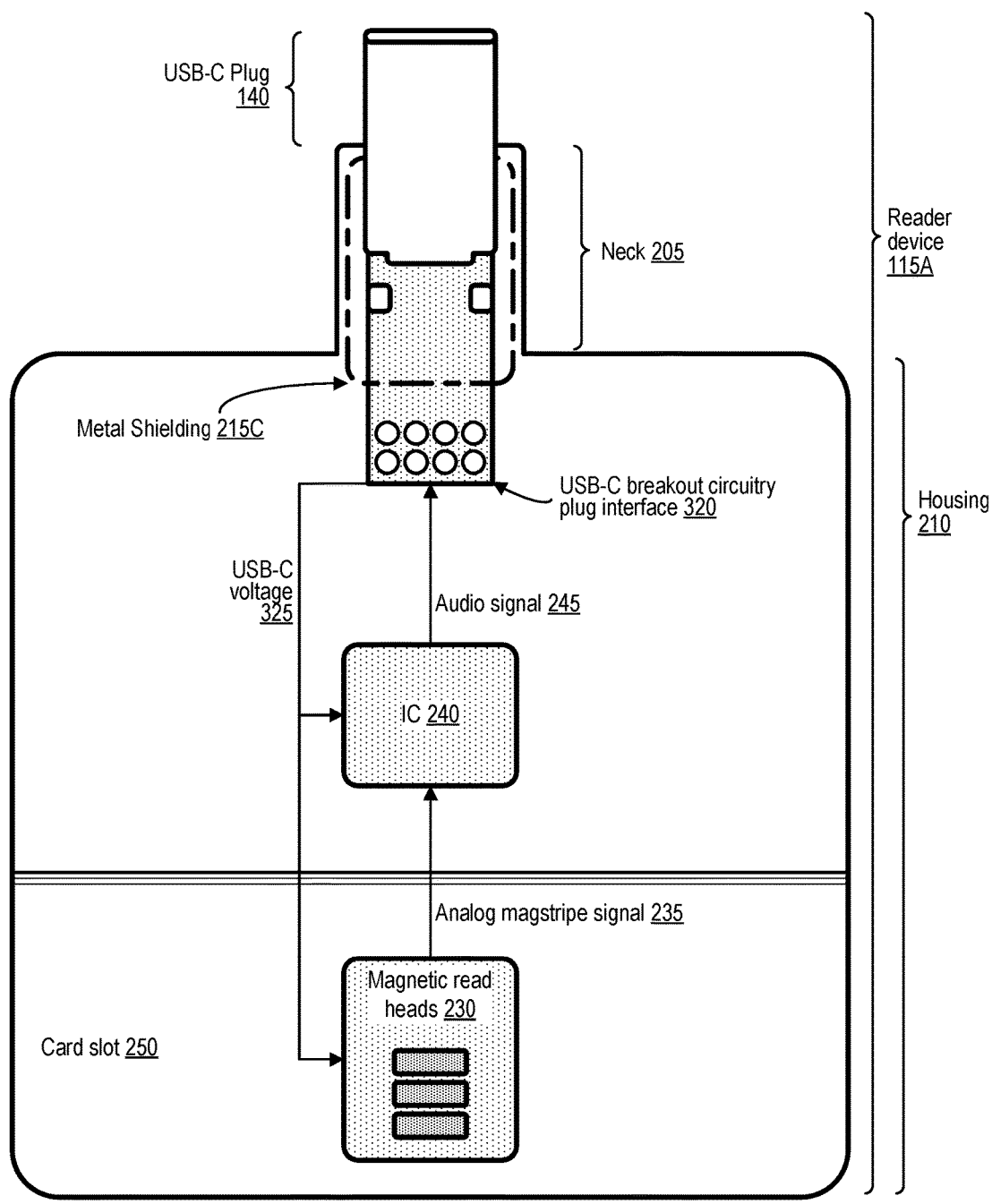
FIG. 3A illustrates a cross-section view of a magstripe card reader with a Universal Serial Bus Type-C (USB-C) plug and a connector interface operating in audio adapter accessory mode.

FIG. 3A illustrates a cross-section view of a magstripe card reader with a Universal Serial Bus Type-C (USB-C) plug and a connector interface operating in audio adapter accessory mode.

Like the reader device 110A of FIG. 2A, the reader device 115A of FIG. 3A includes only the magnetic read heads 230 and IC 240, both of which are powered by USB-C voltage 325 from the USB-C plug interface 320 but otherwise function the same way they do in FIG. 2A.

The USC-C plug 140 and USB-C plug interface 320 in FIG. 3A utilize the "audio adapter accessory mode" of USB-C, which allows analog audio signals to be sent directly over USB-C. Unfortunately, not all USB-C mobile devices 105B support audio adapter accessory mode, and figuring out which devices do support this mode is fairly unpredictable. In the end, then, while the reader device 115A of FIG. 3A is appealingly simple, it is not as practical as the reader device 115B of FIG. 3B, which has no such limitations.

Figure 3B:
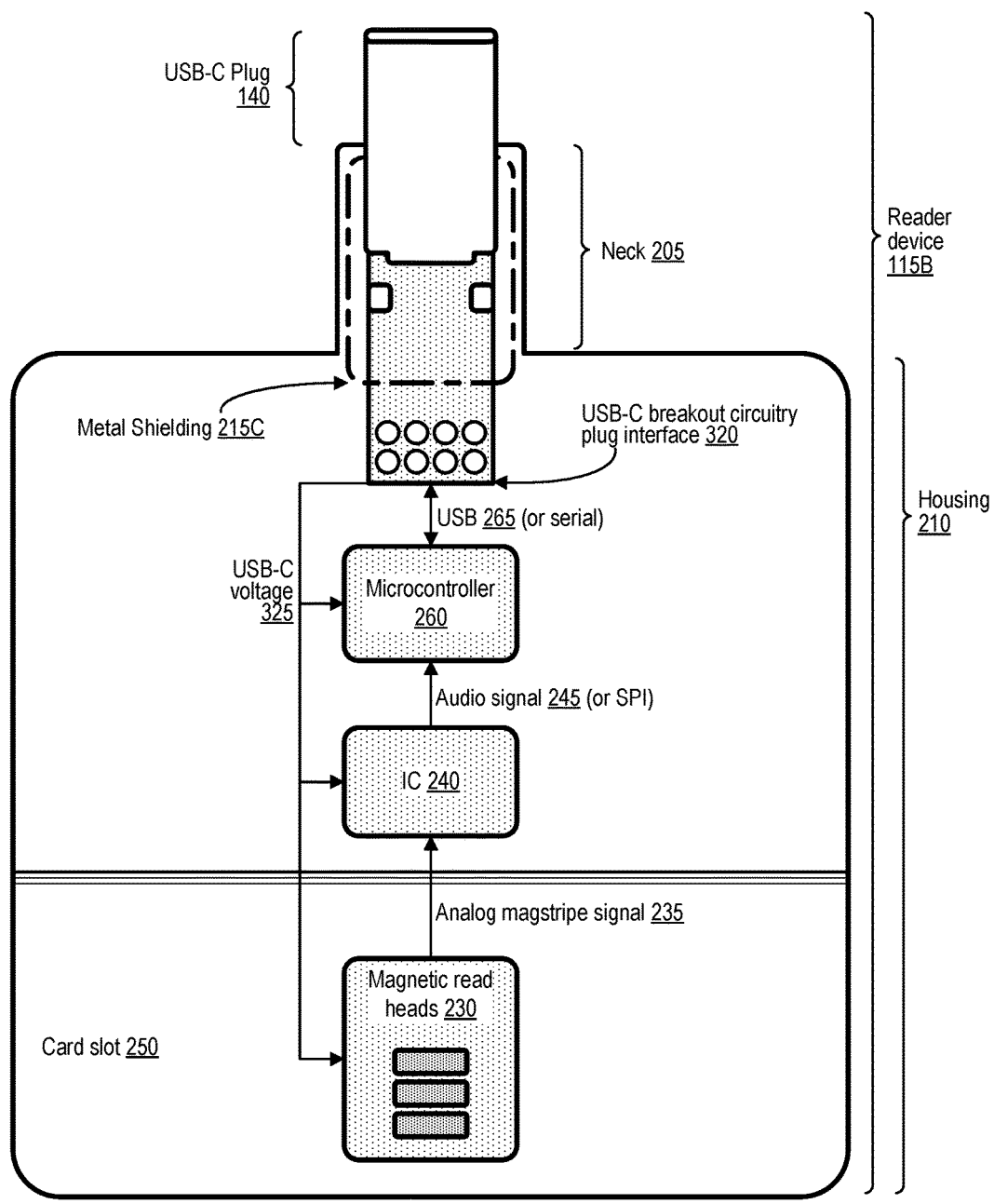
FIG. 3B illustrates a cross-section view of a magstripe card reader with a Universal Serial Bus Type-C (USB-C) plug and a connector interface and a microcontroller.

FIG. 3B illustrates a cross-section view of a magstripe card reader with a Universal Serial Bus Type-C (USB-C) plug and a connector interface and a microcontroller.

Like the reader device 110B of FIG. 2B, the reader device 115B of FIG. 3B includes the magnetic read heads 230, IC 240, and microcontroller 260, each of which are powered by USB-C voltage 325 from the USB-C plug interface 320 but otherwise function mostly the same way they do in FIG. 2B.

The authorization circuit 270 of the reader device 110B of FIG. 2B is not necessary in the reader device 115B of FIG. 3B because the USB-C standard does not need to be licensed or authorized the way that the Apple® Lightning® MFI standard does.

Figure 4:
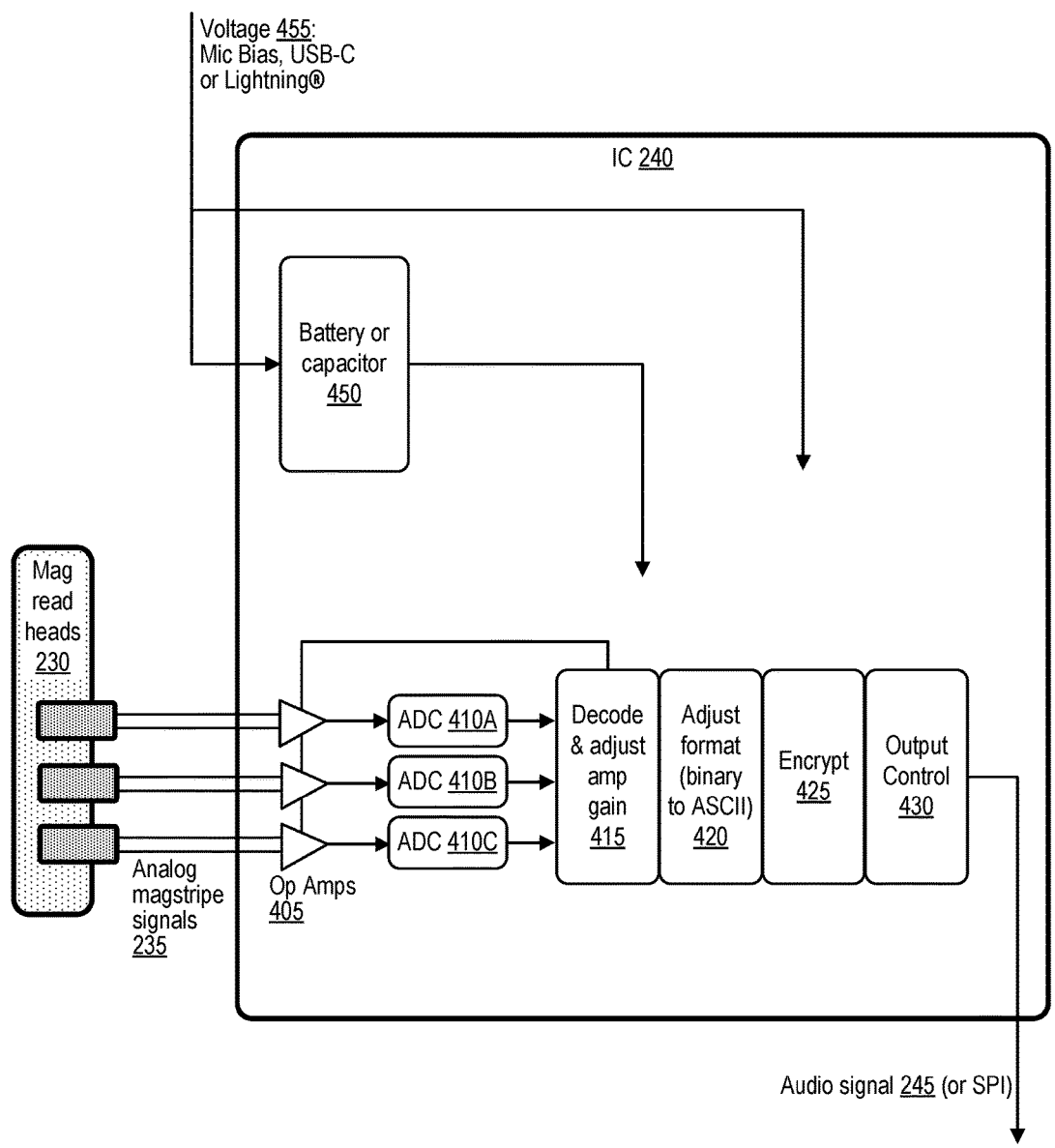
FIG. 4 illustrates a block diagram of an integrated circuit used in the magstripe card reader.

FIG. 4 illustrates a block diagram of an integrated circuit used in the magstripe card reader.

A voltage 455 provided as microphone bias voltage, USB-C voltage, Apple® Lightning® voltage, or some other voltage is provided to the IC 240, which may be used directly to power the components of the IC 240 or may be used to charge a battery 450 and/or capacitor 450 that, in turn, is used to power the components of the IC 240.

The magnetic read heads 230 supply inputs to the IC 240 in the form of analog magnetic stripe signals 235. IC 240 generates a digital version of the analog magnetic stripe signal 235 via operational amplifiers 405 and ADCs 410. The IC decodes the result of the ADCs 410 at block 415 and simultaneous adjusts gain of the operational amplifiers as needed. At block 420, the IC 240 then converts the resulting binary into an alphanumeric American Standard Code for Information Interchange (ASCII) string, and then encrypts the this ASCII string at block 425. The IC 240 then turns the encrypted digital version of the analog magnetic stripe signal 235 into an audio signal 245 or SPI signal 245 at the output control block 430. Each of blocks 415-430 may be a single component of any kind discussed with respect to element 610 of FIG. 6, or a cluster of such components. At the same time, certain ones of the blocks 415-430 (and their associated components) may be combined and/or rearranged.

Figure 5:
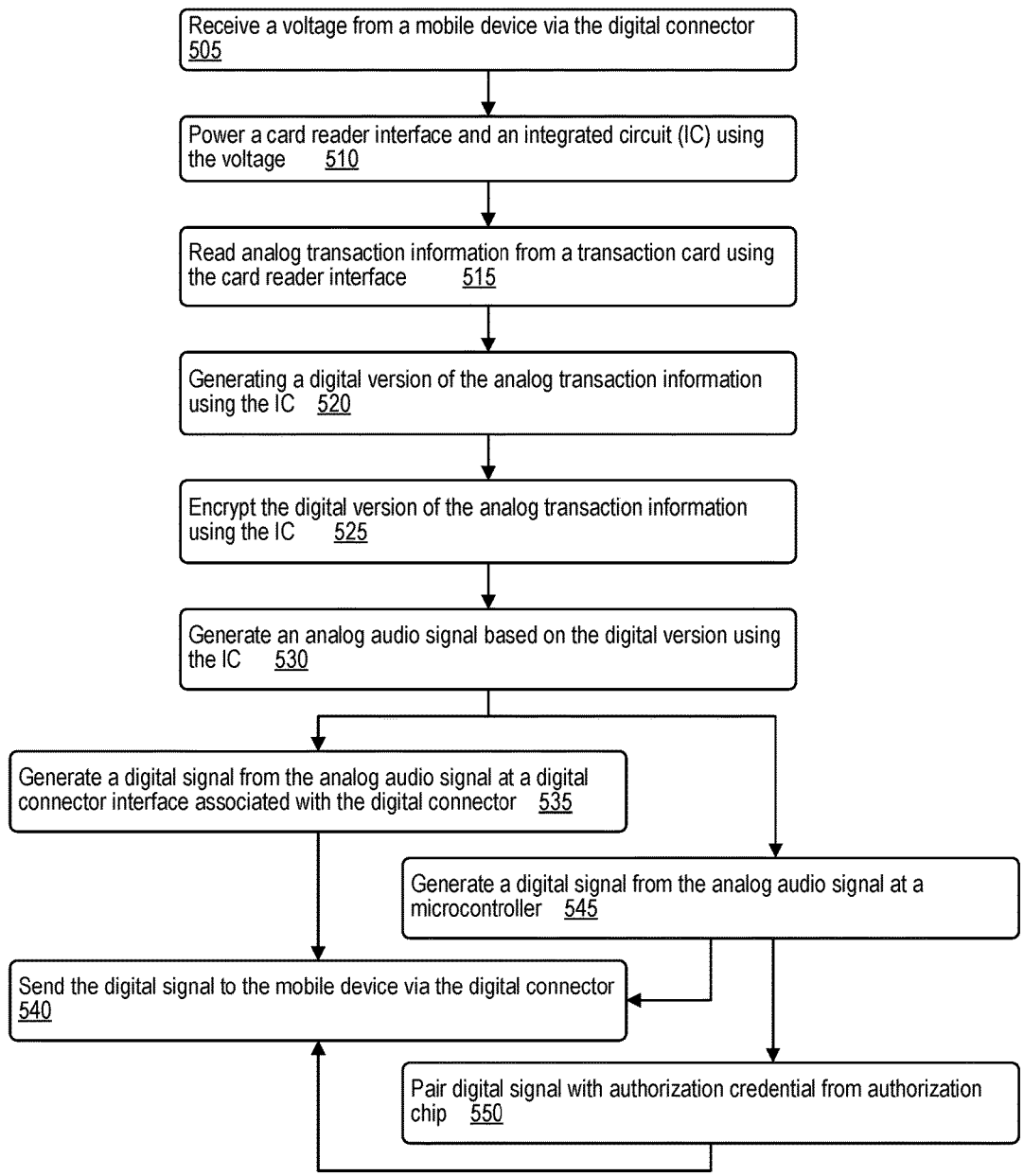
FIG. 5 is a flow diagram illustrating operation of a magstripe card reader with a digital connector and an internal audio signal path.

FIG. 5 is a flow diagram illustrating operation of a magstripe card reader with a digital connector and an internal audio signal path.

At step 505, the reader device 110/115 receives a voltage from a mobile device via the digital connector. At step 510, the voltage is used to power a card reader interface such as the read head (or another type of transaction object reader circuitry 670 discussed with respect to FIG. 6) and an integrated circuit (IC) using the voltage.

At step 515, the magnetic read head 230 or other transaction object reader circuitry 670 is used to read analog transaction information from a transaction card or other transaction object.

At step 520, the IC 240 generates a digital version of the analog transaction information. At step 525, the IC 240 encrypts the digital version of the analog transaction information. At step 530, the IC 240 generates an analog audio signal or SPI signal based on the digital version. Step 530 is followed by step 545 if the reader device 110/115 includes a microcontroller 260 (see reader devices 110B, 110C, 115B), and by step 535 if it does not (see reader devices 110A, 115A).

At step 535, the digital connector interface (e.g., plug interfaces 220, 255, 320) associated with the digital connector (e.g., plug 140, 145) generates a digital signal from the analog audio signal.

At step 540, the reader device 110/115 sends the digital signal to the mobile device 105 via the digital connector.

At step 545, the microcontroller 260 generates a digital signal from the analog audio signal or SPI signal. Step 545 is followed by step 550 if the reader device 110 includes an authorization chip 270 (see reader devices 110B, 110C), and by step 540 if it does not (see reader device 115B).

At step 550, the reader device 110 pairs the digital signal with authorization credential from authorization chip 270. Step 550 is followed by step 540.

FIG. 6 illustrates exemplary circuit board components 600 that may be used to implement an embodiment of the present invention. The circuit board 100 described herein may include any combination of at least a subset of the circuit board components 600. In some embodiments, the circuit board 100 may actually include multiple circuit boards connected in a wired or wireless fashion, some of which may be at least partially enclosed by the security housing.

The circuit board components 600 of FIG. 6 may include one or more processors 610, controllers 610, microcontrollers 610, application specific integrated circuits (ASICs) 610, or field-programmable gate arrays (FPGAs) 610. These may in some cases aid in tamper detection, such as by performing at least some subset of the functions identified in FIG. 6. The circuit board components 600 of FIG. 6 may include one or more memory components 620 that may store, at least in part, instructions, executable code, or other data for execution or processing by the processor or controller 610. The memory components 620 may include, for example, cache memory, random access memory (5AM), read-only memory (ROM), or some other type of computer-readable storage medium.

The circuit board components 600 of FIG. 6 may further includes one or more computer-readable storage medium(s) 630 for storing data, such as a hard drive, magnetic disk drive, optical disk drive, flash memory, magnetic tape based memory, or another form of non-volatile storage. These may, for example, store credit card information, cryptographic keys, or other information, and may in some cases encrypt or decrypt such information with the aid of the processor or controller 610. The computer-readable storage medium(s) 630 may in some cases store, at least in part, instructions, executable code, or other data for execution or processing by the processor or controller 610.

The circuit board components 600 of FIG. 6 may include tamper detection circuitry 640, which may include any of the tamper detection circuit 150 discussed herein, and may include the board connector piece holder(s) 255 and any components discussed in FIG. 6.

The circuit board components 600 of FIG. 6 may include output device circuitry 650, which may include, for example, communication circuitry for outputting data through wired or wireless means, display circuitry for displaying data via a display screen, audio circuitry for playing audio via headphones or a speaker, printer circuitry for printing data via a printer, or some combination thereof. The display screen may be a liquid crystal display (LCD), a plasma display, an organic light-emitting diode (OLED) display, an electronic ink display, a projector-based display, a holographic display, or some combination thereof. The printer may be inkjet, laserjet, thermal, or some combination thereof. In some cases, the output device circuitry 650 may allow for transmission of data over an headphone audio jack, a microphone jack, BLUETOOTH™ wireless signal transfer, radio-frequency identification (RFID), near-field communications (NFC), 802.11 Wi-Fi, cellular network data transfer, or some combination thereof. The output device circuitry 650 may also include The circuit board components 600 of FIG. 6 may include input device circuitry 660, which may include, for example, communication circuitry for outputting data through wired or wireless means, microphone circuitry for receiving audio data, user interface circuitry for receiving user interface inputs, or some combination thereof, and may include variable pressure detection. Touchscreens may be capacitive, resistive, acoustic, or some combination thereof. In some cases, the input device circuitry 660 may allow receipt of data over an headphone audio jack, a microphone jack, BLUETOOTH™ wireless signal transfer, radio-frequency identification (RFID), near-field communications (NFC), 802.11 Wi-Fi, cellular network data transfer, or some combination thereof. Input device circuitry 660 may receive data from an alpha-numeric keypad or keyboard, a pointing device, a mouse, a trackball, a trackpad, a touchscreen, a stylus, cursor direction keys, or some combination thereof. The input device circuitry 660 may also receive data from the transaction object reader circuitry 670.

The circuit board components 600 of FIG. 6 may include transaction object reader circuitry 670, which may include components capable of reading information from a transaction object, or may include circuitry supporting components capable of reading information from a transaction object, with the actual object reader components located off of the circuit board 100. The transaction object reader 670 may include at least one card reader. In this case, the transaction object may be a magnetic stripe onboard a transaction card, an integrated circuit (IC) chip onboard a transaction card, and/or a smartcard chip onboard a transaction card. The transaction card itself may be a credit card, a debit card, an automated teller machine (ATM) card, a gift card, a transit card, an identification card, a game token card, a ticket card, a bank card associated with a bank account, a credit union card associated with a credit union account, an online gaming card associated with an online gaming account, a healthcare card associated with a health savings account (HSA) or flexible spending account (FSA), or a user account card associated with a user account of another type, or some combination thereof. The transaction object reader 670 may include at least one wireless signal reader for reading information wirelessly. In this case, the transaction object may be any of the transaction-card-related transaction objects discussed above (but read wirelessly), or they may be non-card objects capable of wireless communication, such as smartphones, tablets, wearable devices, active near field communication (NFC) and/or radio-frequency identification (RFID) tags, passive NFC and/or RFID tags, or other mobile devices that are capable of wireless communication via NFC, RFID, Bluetooth®, Bluetooth® Low Energy®, WLAN, Wi-Fi, or some combination thereof.

Transaction object reader circuitry 670 may include, for example, a magnetic read head or other type of magnetic stripe reader that is capable of reading information from a magnetic stripe of a transaction card. Transaction object reader circuitry 670 can also include an integrated circuit (IC) chip reader and/or smartcard chip reader for reading an IC chip and/or smartcard chip embedded in a transaction card. Such an IC chip/smartcard chip can follow the Europay-MasterCard-Visa (EMV) payment chip standard. The IC chip/smartcard chip reader can be contact-based, in that it can include one or more conductive prongs that contact a conductive metal contact pad of the IC chip/smartcard chip. The IC chip/smartcard chip can instead be contactless and use a contactless antenna. The contactless antenna can also double as a receiver for near-field-communication (NFC) signals, radio-frequency identification (RFID) signals, Bluetooth® wireless signals, wireless local area network (WLAN) signals, 802.xx Wi-Fi signals, or some combination thereof, which can be sent from a transaction card or from a another type of transaction object as discussed above. In some cases, a transaction object may only send these wireless signals in response to receipt of a magnetic field or other wireless signals from the transaction object reader circuitry 670. For example, if the transaction object is a passive NFC/RFID tag or functions based on similar technology, it generates energy from the magnetic field or other wireless signals from the transaction object reader circuitry 670 via induction coil(s) that is then used to transmit the wireless signals that are ultimately read by the transaction object reader circuitry 670.

The information read from the transaction object by the transaction object reader circuitry 670, regardless of the type of the transaction object, may include at least credit card information, debit card information, automated teller machine (ATM) information, gift card account information, transit account information, identification card information, game token card information, ticket information, bank account information, credit union account information, online gaming account information, HSA/FSA account information, health insurance account information, healthcare information, or some combination thereof. Certain terms discussed herein should be understood to refer to transaction objects, including but not limited to "payment object," "transaction object," "financial object," "payment card," "transaction card," or "financial card."

Peripheral circuitry 680 may include any type circuitry permitting connection and use of computer support devices to add additional functionality to the circuit board 100. For example, peripheral circuitry 680 may support connection of a modem or a router. The components shown in FIG. 6 are depicted as being connected via a single bus 690. However, the components may be connected through one or more data transport means. For example, processor unit 610 and main memory 610 may be connected via a local microprocessor bus, and the storage medium 630, tamper detection circuitry 640, output device circuitry 650, input device circuitry 660, transaction object reader circuitry 670, and peripheral circuitry 680 may be connected via one or more input/output (I/O) buses.

While various flow diagrams have been described above, it should be understood that these show a particular order of operations performed by certain embodiments of the invention, and that such order is exemplary. Alternative embodiments can perform the operations in a different order, combine certain operations, or overlap certain operations illustrated in or described with respect to each flow diagram.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. A magnetic stripe card reader device having a first digital connector that communicates with a second digital connector of a mobile device, and having an internal analog signal path, the magnetic stripe card reader device comprising:
 a housing;
 a neck extending from a surface of the housing;
 a magnetic stripe read head in the housing, wherein the magnetic stripe read head reads analog magnetic stripe information from a magnetic stripe card in response to the magnetic stripe card passing through a slot in the housing;
 an integrated circuit (IC) in the housing, wherein the IC receives the analog magnetic stripe information from the magnetic stripe card read head, wherein the IC generates a digital version of the analog magnetic stripe information, wherein the IC generates an analog audio signal based on the digital version, and wherein the IC sends the analog audio signal to a digital connector interface via the internal analog signal path;
 the digital connector interface partially in the neck and partially in the housing, wherein the digital connector interface receives the analog audio signal via the internal analog signal path, wherein the digital connector interface generates a digital signal based on the analog audio signal, wherein the digital connector interface sends the digital signal to the first digital connector, and wherein the digital connector interface outputs a microphone bias voltage to provide power to the IC; and
 the first digital connector extending from the neck, wherein the first digital connector sends the digital signal to the second digital connector of the mobile device.

2. The magnetic stripe card reader device of claim 1, further comprising a metal shield that encloses and is secured to the digital connector interface, wherein a first portion of the metal shield is disposed within the neck, wherein a second portion of the metal shield is disposed within the housing and is wider than the neck, the second portion of the metal shield thereby preventing the first digital connector and the digital connector interface from detaching from each other in response to a force that pulls the first digital connector away from the housing.

3. The magnetic stripe card reader device of claim 1, wherein the first digital connector is a plug, and wherein the second digital connector is a port that receives the plug.

4. The magnetic stripe card reader device of claim 1, further comprising:
a flex circuit that is flexible and within the housing, wherein the magnetic read head and the IC are on the flex circuit; and
an interposer that is rigid and within the housing, wherein a first end of the interposer is coupled to the digital connector interface, wherein a second end of the interposer is coupled to the flex circuit.

5. The magnetic stripe card reader device of claim 1, wherein the first digital connector and the second digital connector are APPLE® LIGHTNING® connectors.

6. The magnetic stripe card reader device of claim 5, wherein the digital connector interface includes an analog-to-digital converter (ADC) that converts the analog audio signal into the digital signal.

7. The magnetic stripe card reader device of claim 5, further comprising an authorization chip, wherein the digital connector interface generates the digital signal according to an APPLE® LIGHTNING® communication protocol based on information provided by the authorization chip.

8. The magnetic stripe card reader device of claim 1, wherein the first digital connector and the second digital connector are Universal Serial Bus (USB) connectors, and further comprising:
a microcontroller that converts the analog audio signal to the digital signal based on the analog audio signal, wherein the digital signal conforms to a USB data protocol.

9. The magnetic stripe card reader device of claim 1, wherein the first digital connector and the second digital connector are Universal Serial Bus (USB) connectors, and wherein the digital signal includes the analog audio signal conveyed via an audio adapter accessory mode associated with the USB connectors.

10. The magnetic stripe card reader device of claim 1, wherein the analog audio signal is an analog microphone audio signal.

11. The magnetic stripe card reader device of claim 1, further comprising a battery disposed within the housing, wherein the IC and the magnetic stripe read head are powered by the battery, wherein the microphone bias voltage charges the battery.

12. The magnetic stripe card reader device of claim 1, wherein the IC encrypts the digital version of the analog magnetic stripe information, wherein the analog audio signal conveys an encrypted version of the digital version of the analog magnetic stripe information.

13. The magnetic stripe card reader device of claim 1, wherein the IC converts the digital version of the analog magnetic stripe information into American Standard Code for Information Interchange (ASCII).

14. A transaction object reader device having a first digital connector that communicates with a second digital connector of a mobile device, and having an internal analog signal path, the transaction object reader device comprising:
a transaction object reader interface that reads analog transaction information from a transaction object in response to the transaction object moving into a proximity of the transaction object reader interface;
an integrated circuit (IC) that receives the analog transaction object information from the transaction object reader interface, wherein the IC generates a digital version of the analog transaction information using at least one analog to digital converter (ADC), wherein the IC outputs an analog signal based on the digital version along the internal analog signal path;
a digital connector interface that generates a digital signal based on the analog signal, wherein the digital connector interface also outputs a microphone bias voltage to provide power to at least the IC; and
the first digital connector, wherein the first digital connector sends the digital signal to the second digital connector of the mobile device.

15. The transaction object reader device of claim 14, wherein the voltage provided by the digital connector interface is supplied by the second digital connector of the mobile device to the first digital connector.

16. The transaction object reader device of claim 14, wherein the transaction object is a magnetic stripe of a transaction card, and wherein the transaction object reader interface is a magnetic stripe read head.

17. The transaction object reader device of claim 14, wherein the transaction object is a Europay/Mastercard/Visa (EMV) chip of a transaction card, and wherein the transaction object reader interface is an EMV chip reader.

18. The transaction object reader device of claim 14, wherein the transaction object is a wireless near field communication (NFC) signal from a NFC-capable transaction object, and wherein the transaction object reader interface is an NFC transceiver.

19. A method of facilitating a transaction using a card reader with a digital connector and an internal analog path, the method comprising:
receiving an input voltage from a mobile device via the digital connector;
outputting a microphone bias voltage from a digital connector interface coupled to the digital connector to provide power to at least an integrated circuit (IC);
providing power to a card reader interface using the digital connector interface;
reading analog transaction information from a transaction card using the card reader interface in response to providing power to the card reader interface;
generating a digital version of the analog transaction information using the IC;
generating an analog signal based on the digital version using the IC;
generating a digital signal from the analog signal at a digital connector interface associated with the digital connector; and
sending the digital signal to the mobile device via the digital connector.

20. The method of claim 19, further comprising:
encrypting the digital version of the analog transaction information using the IC.

* * * * *